United States Patent
Kusafuka et al.

(10) Patent No.: US 11,343,484 B2
(45) Date of Patent: May 24, 2022

(54) DISPLAY DEVICE, DISPLAY SYSTEM, AND MOVABLE VEHICLE

(71) Applicant: KYOCERA Corporation, Kyoto (JP)

(72) Inventors: Kaoru Kusafuka, Tokyo (JP); Mitsuhiro Murata, Yao (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 17/263,542

(22) PCT Filed: Jul. 25, 2019

(86) PCT No.: PCT/JP2019/029308
§ 371 (c)(1),
(2) Date: Jan. 26, 2021

(87) PCT Pub. No.: WO2020/022457
PCT Pub. Date: Jan. 30, 2020

(65) Prior Publication Data
US 2021/0243419 A1 Aug. 5, 2021

(30) Foreign Application Priority Data
Jul. 27, 2018 (JP) .............................. JP2018-141887

(51) Int. Cl.
*H04N 13/122* (2018.01)
*H04N 13/383* (2018.01)
(Continued)

(52) U.S. Cl.
CPC ........... *H04N 13/122* (2018.05); *B60K 35/00* (2013.01); *H04N 13/31* (2018.05); *H04N 13/383* (2018.05);
(Continued)

(58) Field of Classification Search
CPC .... H04N 13/122; H04N 13/31; H04N 13/383; H04N 13/315; H04N 13/317;
(Continued)

(56) References Cited

U.S. PATENT DOCUMENTS 6,285,368 B1    9/2001 Sudo
9,678,341 B2 *  6/2017 Kim .................. G02B 30/27
(Continued)

FOREIGN PATENT DOCUMENTS

JP    H07287193 A    10/1995
JP    2011-043623 A   3/2011
(Continued)

*Primary Examiner* — Tung T Vo
(74) *Attorney, Agent, or Firm* — Studebaker & Brackett PC

(57) ABSTRACT

A display device is switchable between 3D image display and 2D image display. The display device includes a first display panel, a second display panel, a controller, and an optical system. The first and second display panels each include subpixels arranged in a grid. The controller performs switching and/or is configured to perform switching between multiple display modes including a first display mode for displaying a 2D image and a second display mode for displaying a parallax image on the first display panel, and switches and/or is configured to switch a drive mode of the second display panel between multiple drive modes including a first drive mode corresponding to the first display mode and a second drive mode corresponding to the second display mode.

16 Claims, 15 Drawing Sheets

(51) Int. Cl.
*H04N 13/31* (2018.01)
*B60K 35/00* (2006.01)

(52) U.S. Cl.
CPC ............................ *B60K 2370/149* (2019.05);
*B60K 2370/1529* (2019.05)

(58) Field of Classification Search
CPC .. H04N 13/324; H04N 13/356; H04N 13/361;
B60K 35/00; B60K 2370/149; B60K
2370/1529; G02B 30/32; G02B 30/31;
G02B 2027/0134
USPC .......................................................... 348/54
See application file for complete search history.

(56) References Cited

U.S. PATENT DOCUMENTS

| | | | |
|---|---|---|---|
| 10,778,964 B2* | 9/2020 | Lee | H04N 13/371 |
| 2008/0238919 A1* | 10/2008 | Pack | G06T 17/005 |
| | | | 345/420 |
| 2008/0309811 A1 | 12/2008 | Fujinawa et al. | |
| 2009/0091667 A1* | 4/2009 | Schultz | G02B 30/27 |
| | | | 349/15 |
| 2011/0043715 A1 | 2/2011 | Ohyama et al. | |
| 2011/0063533 A1* | 3/2011 | Kim | G02B 30/25 |
| | | | 349/15 |
| 2011/0234582 A1 | 9/2011 | Daiku et al. | |
| 2012/0224062 A1* | 9/2012 | Lacoste | G02B 27/01 |
| | | | 348/148 |
| 2013/0250568 A1 | 9/2013 | Koito et al. | |
| 2013/0293793 A1* | 11/2013 | Lu | G02B 30/31 |
| | | | 349/15 |
| 2014/0313298 A1 | 10/2014 | Usukura et al. | |
| 2015/0304623 A1* | 10/2015 | Yoon | H04N 13/359 |
| | | | 345/419 |
| 2015/0334379 A1 | 11/2015 | Du et al. | |
| 2016/0070102 A1* | 3/2016 | Takamatsu | G02B 27/0101 |
| | | | 359/631 |
| 2017/0080952 A1* | 3/2017 | Gupta | B60W 50/14 |
| 2017/0168309 A1 | 6/2017 | Kasazumi et al. | |
| 2019/0096121 A1* | 3/2019 | Kang | H04N 13/383 |
| 2019/0139266 A1* | 5/2019 | Budagavi | G06T 17/00 |
| 2019/0156793 A1* | 5/2019 | Sun | H04N 13/383 |
| 2019/0166357 A1* | 5/2019 | Nakagawa | H04N 13/31 |
| 2019/0222820 A1 | 7/2019 | Lee et al. | |
| 2019/0313080 A1* | 10/2019 | Mitchell | H04N 19/597 |
| 2020/0153885 A1* | 5/2020 | Lee | G06T 9/001 |
| 2021/0174559 A1* | 6/2021 | Nakagami | G06T 9/001 |
| 2021/0207971 A1* | 7/2021 | Kim | G01C 21/3635 |
| 2021/0233207 A1* | 7/2021 | Ha | G06T 3/005 |
| 2021/0250600 A1* | 8/2021 | Kuma | H04N 19/172 |
| 2021/0323410 A1* | 10/2021 | Huber | G02B 27/0101 |

FOREIGN PATENT DOCUMENTS

| | | |
|---|---|---|
| JP | 2013-187655 A | 9/2013 |
| JP | 2013-200401 A | 10/2013 |
| JP | 2015-215508 A | 12/2015 |
| WO | 2013/094211 A1 | 6/2013 |
| WO | 2018043836 A1 | 3/2018 |

* cited by examiner

[Fig. 1]
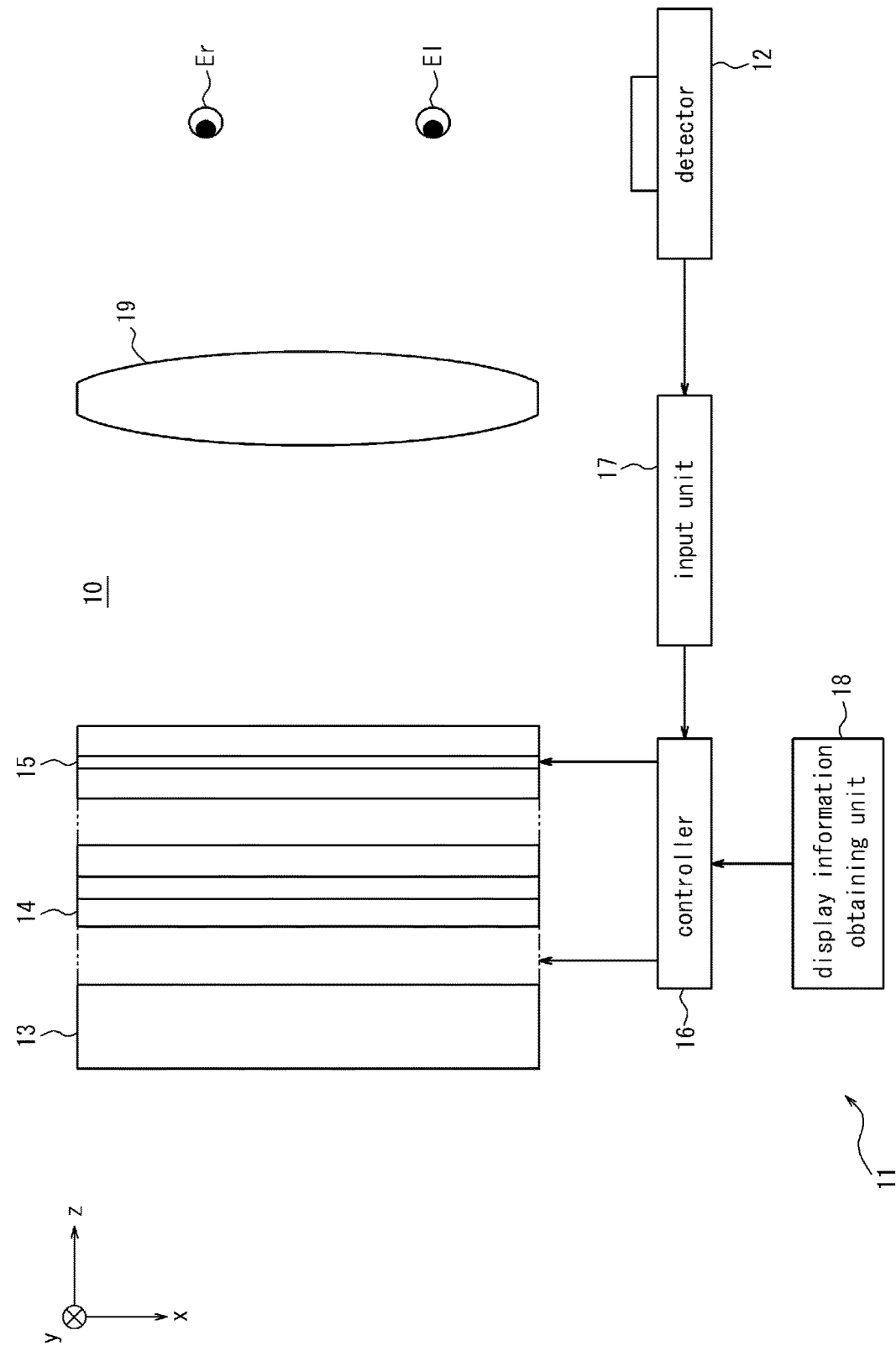

[Fig. 2]
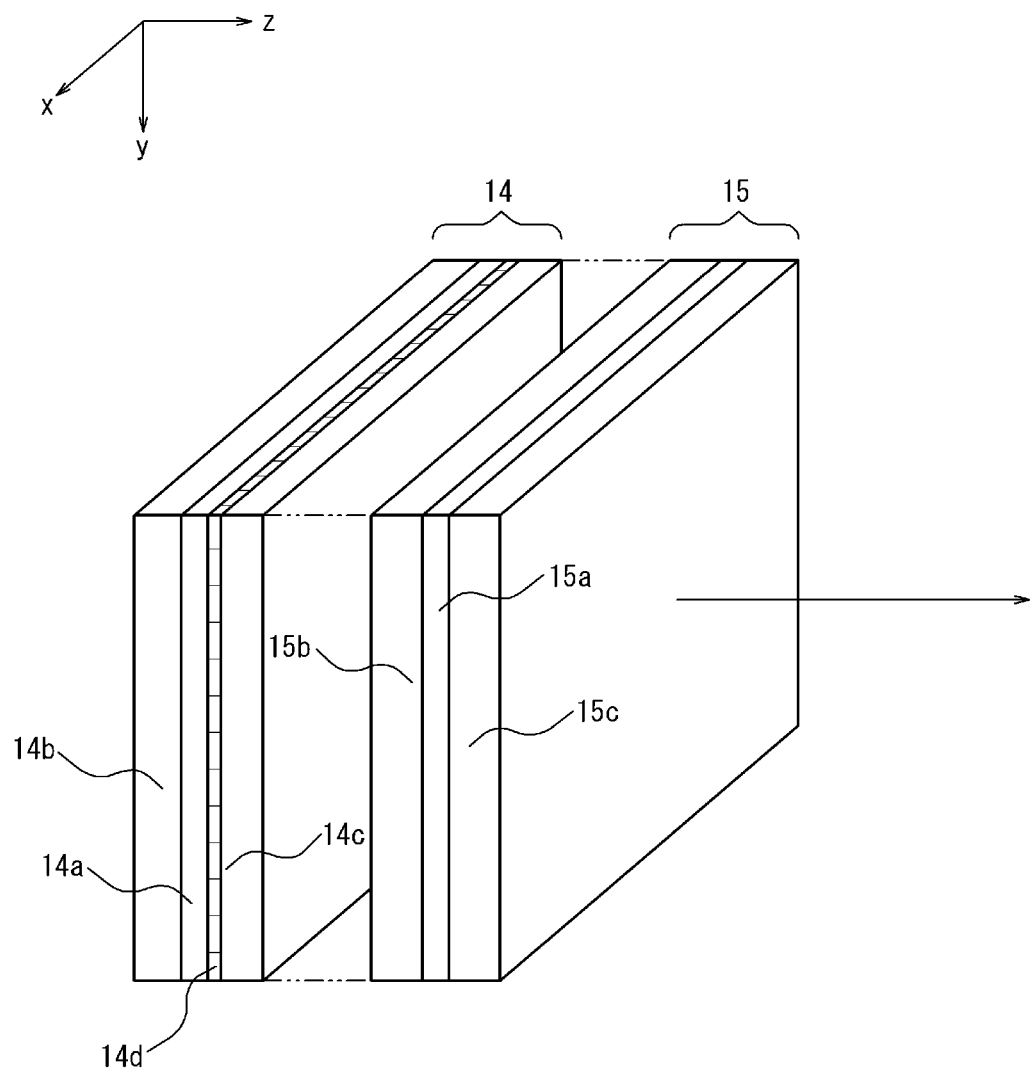

[Fig. 3]
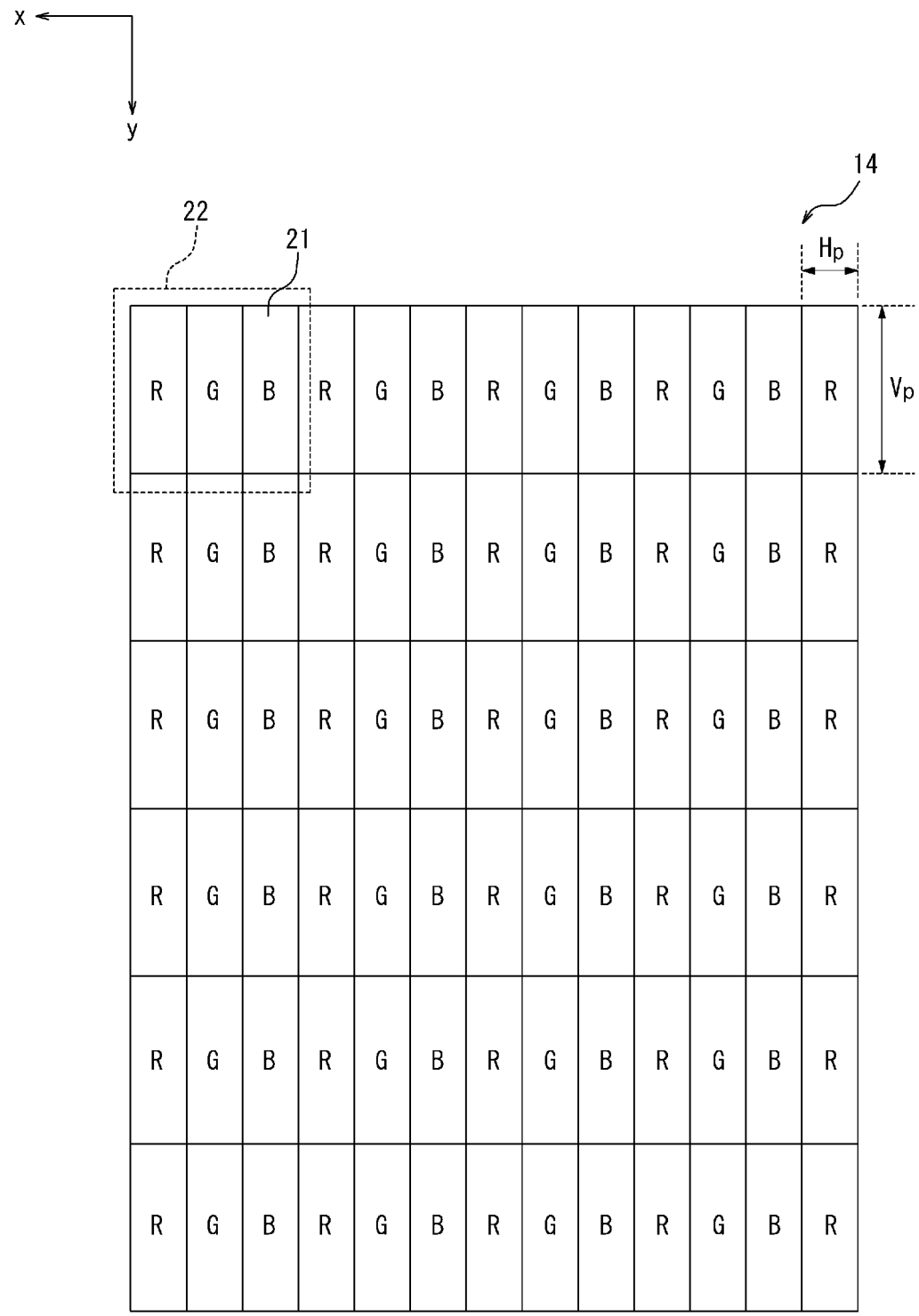

[Fig. 4]
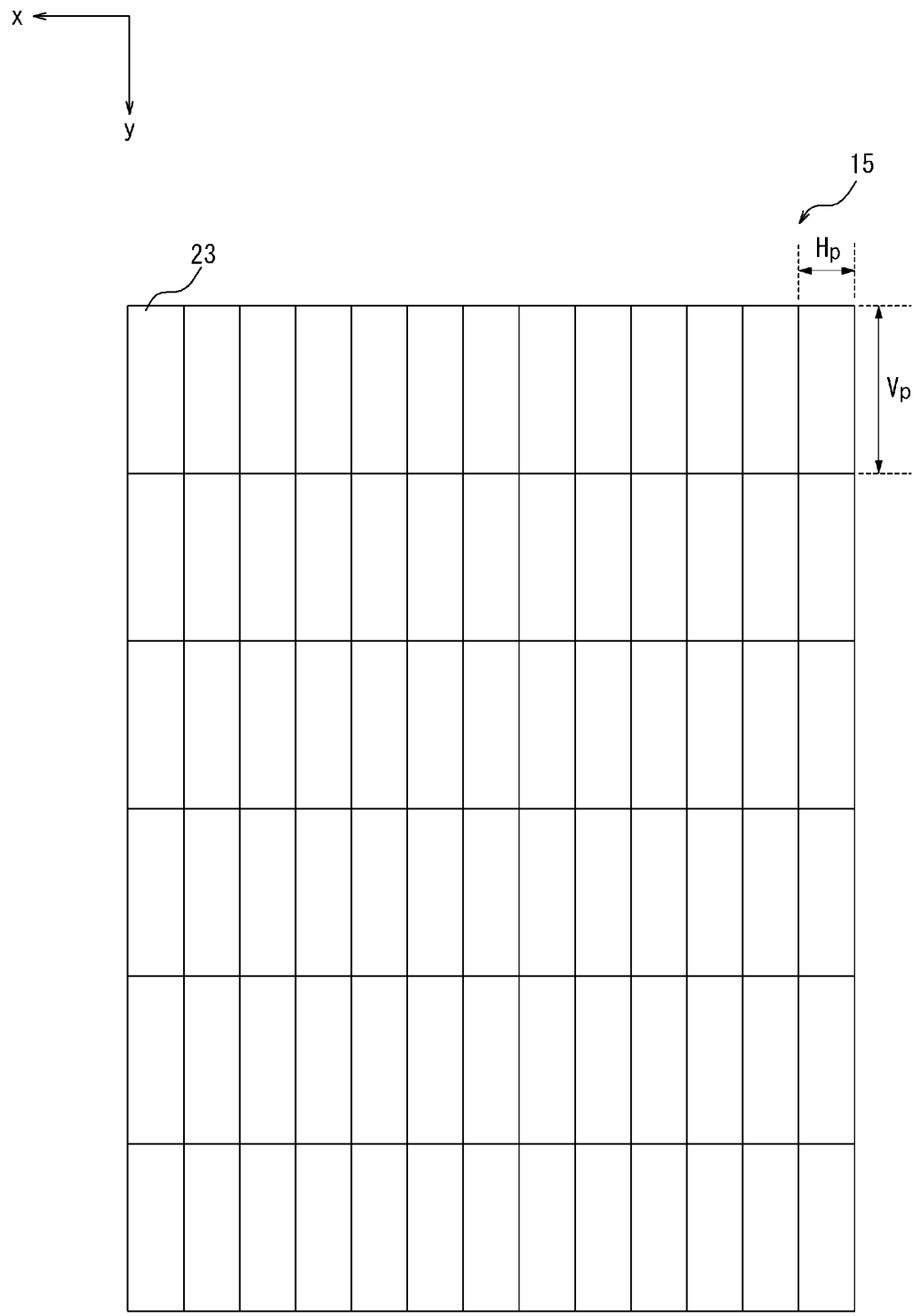

[Fig. 5]
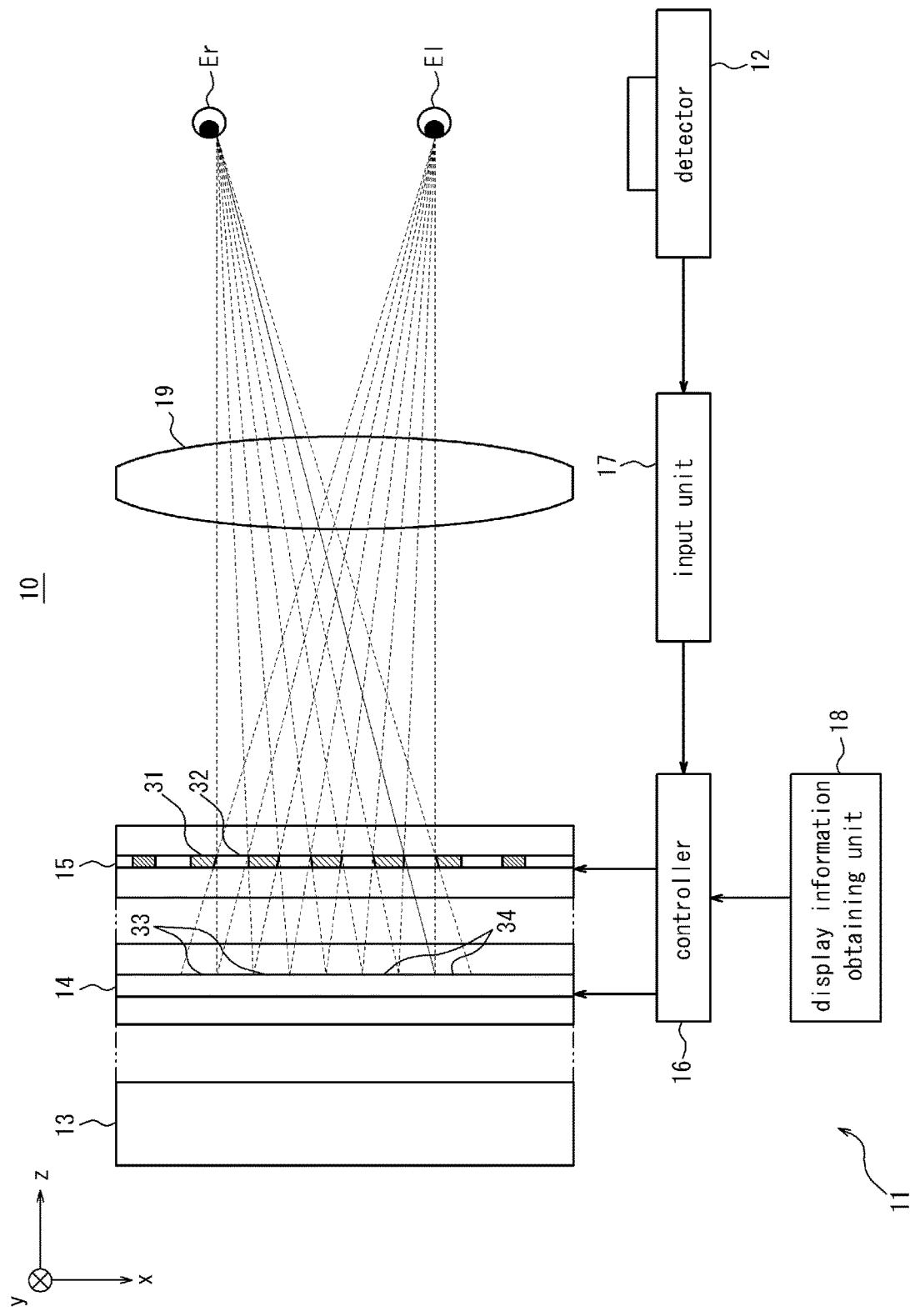

[Fig. 6]
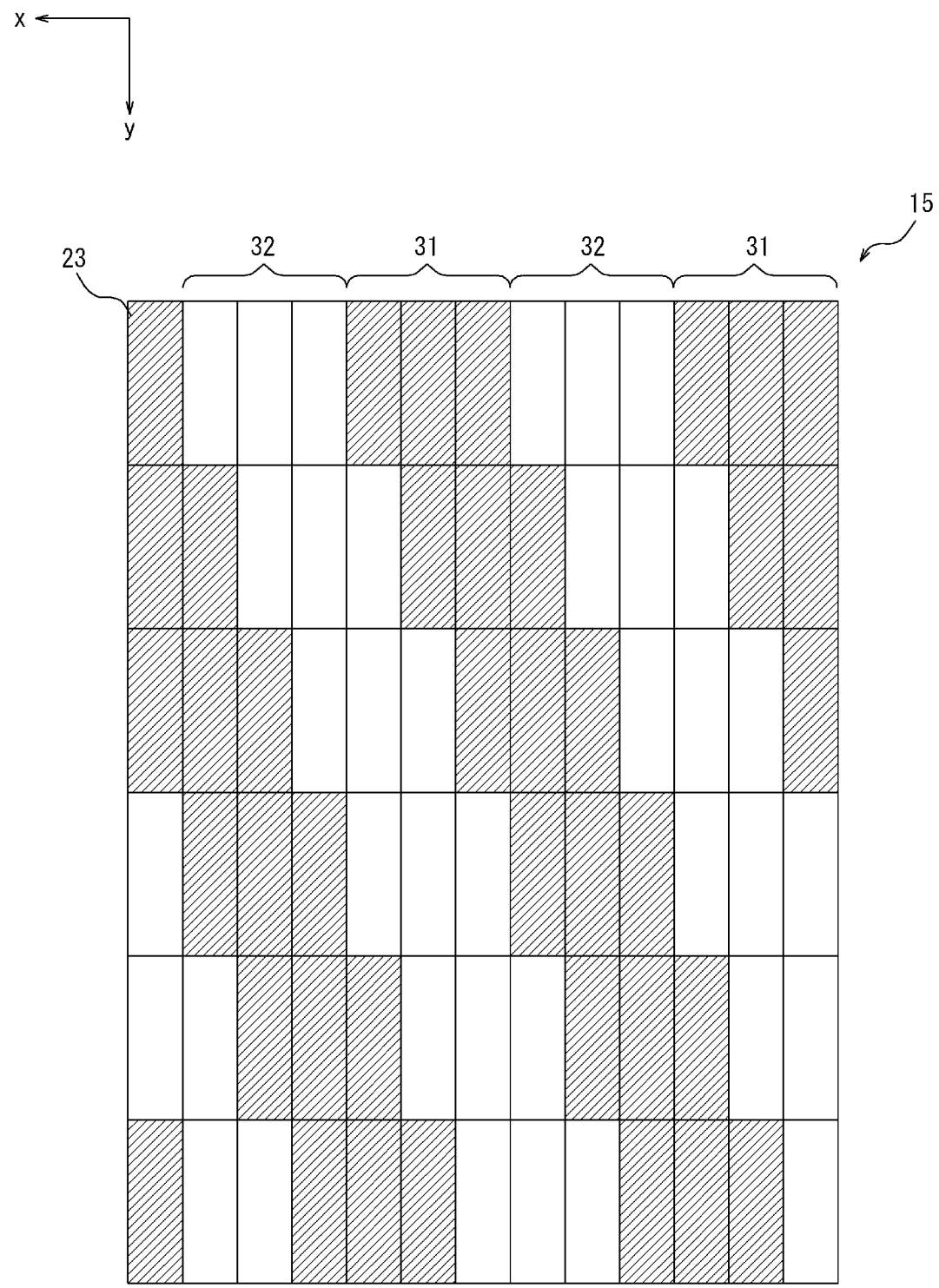

[Fig. 7]
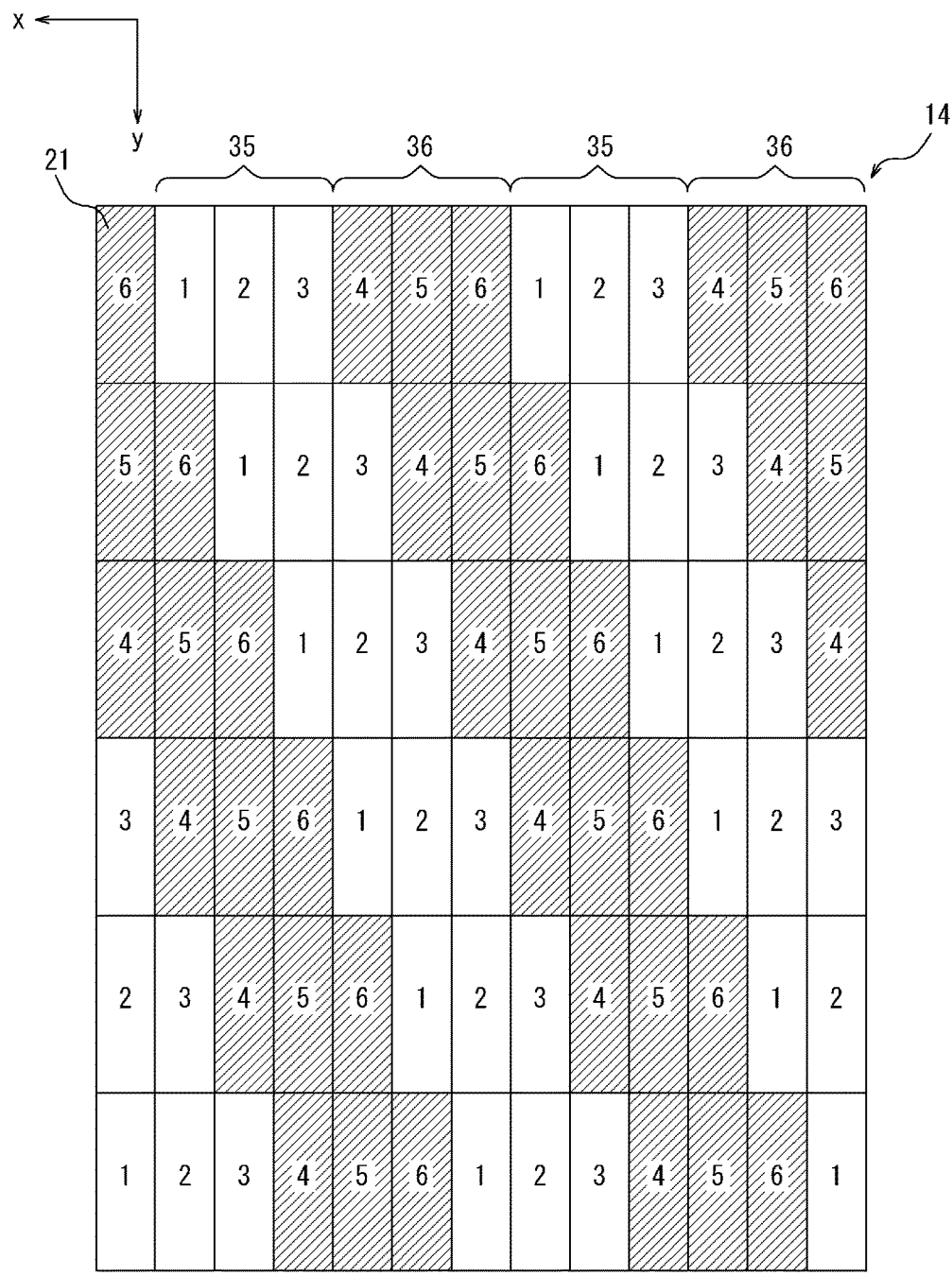

[Fig. 8]
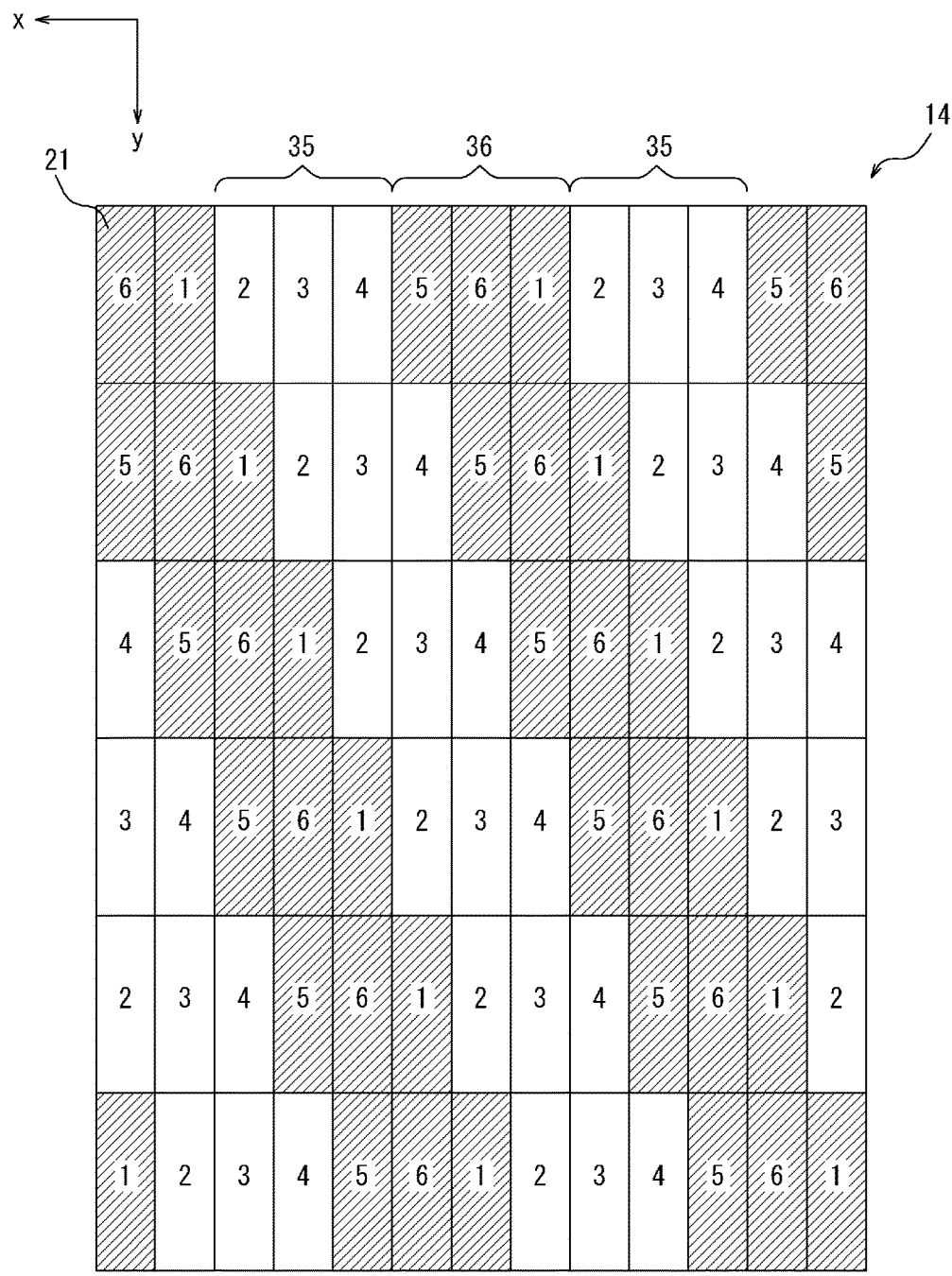

[Fig. 9]
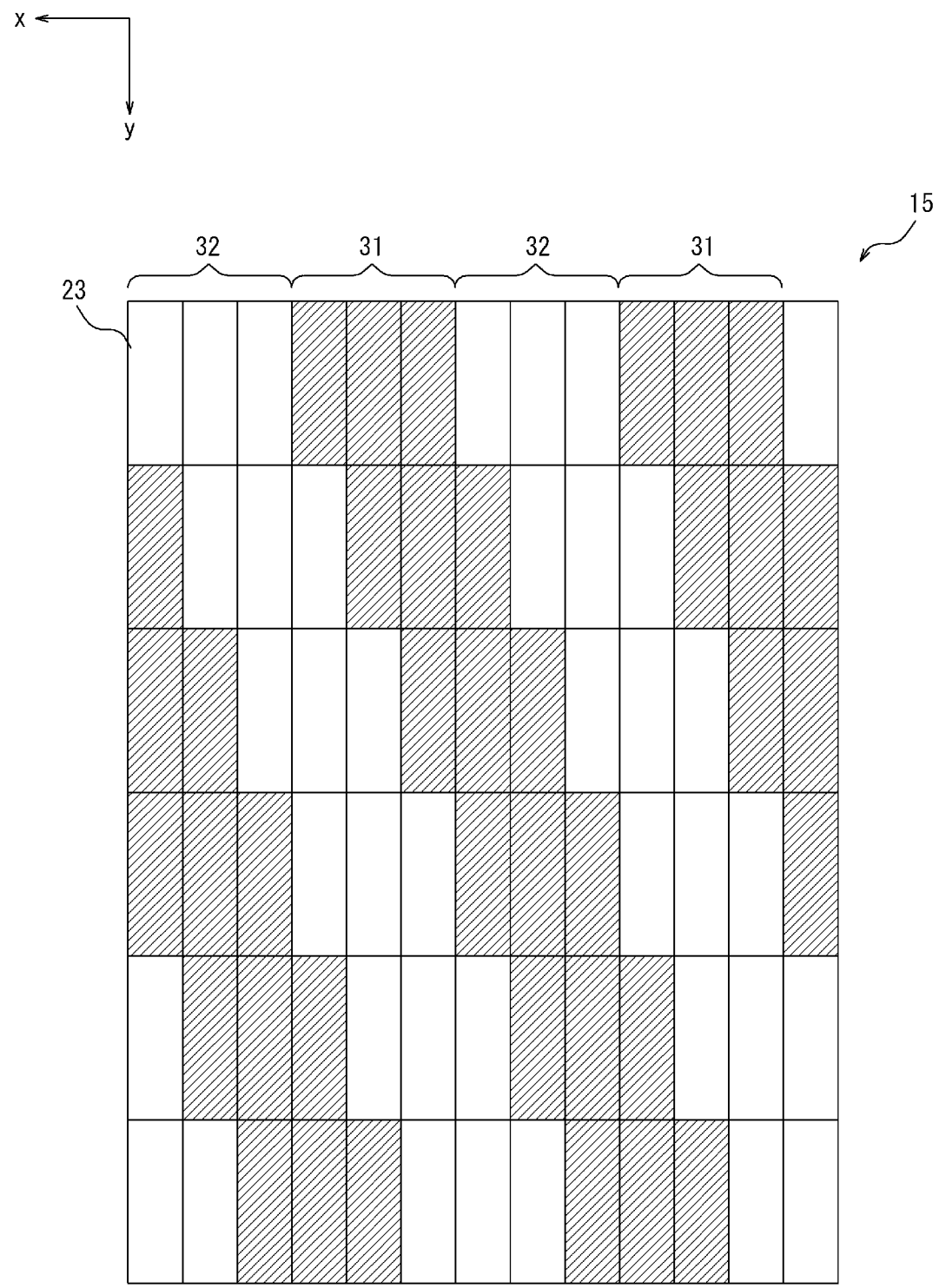

[Fig. 10]
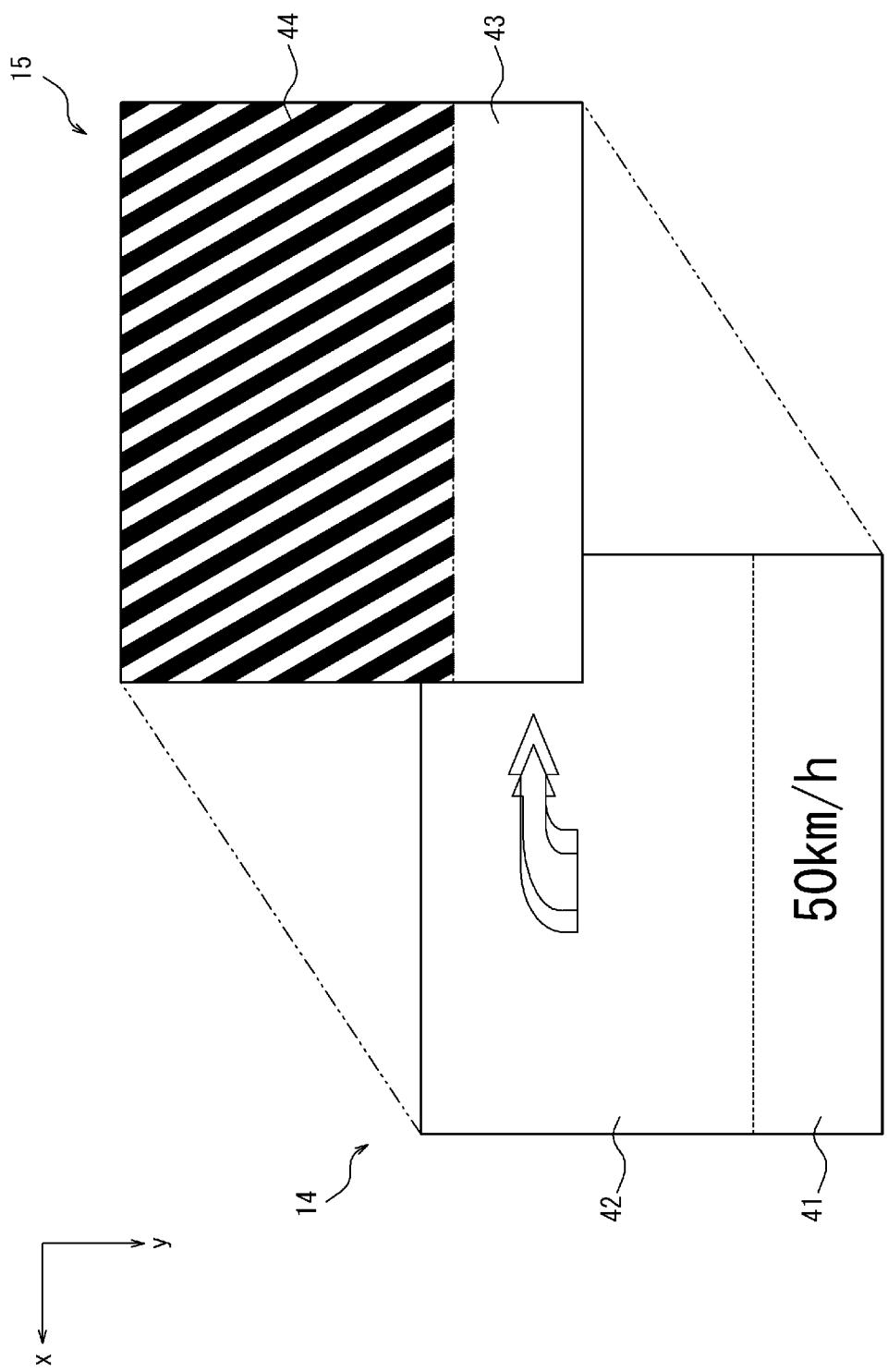

[Fig. 11]
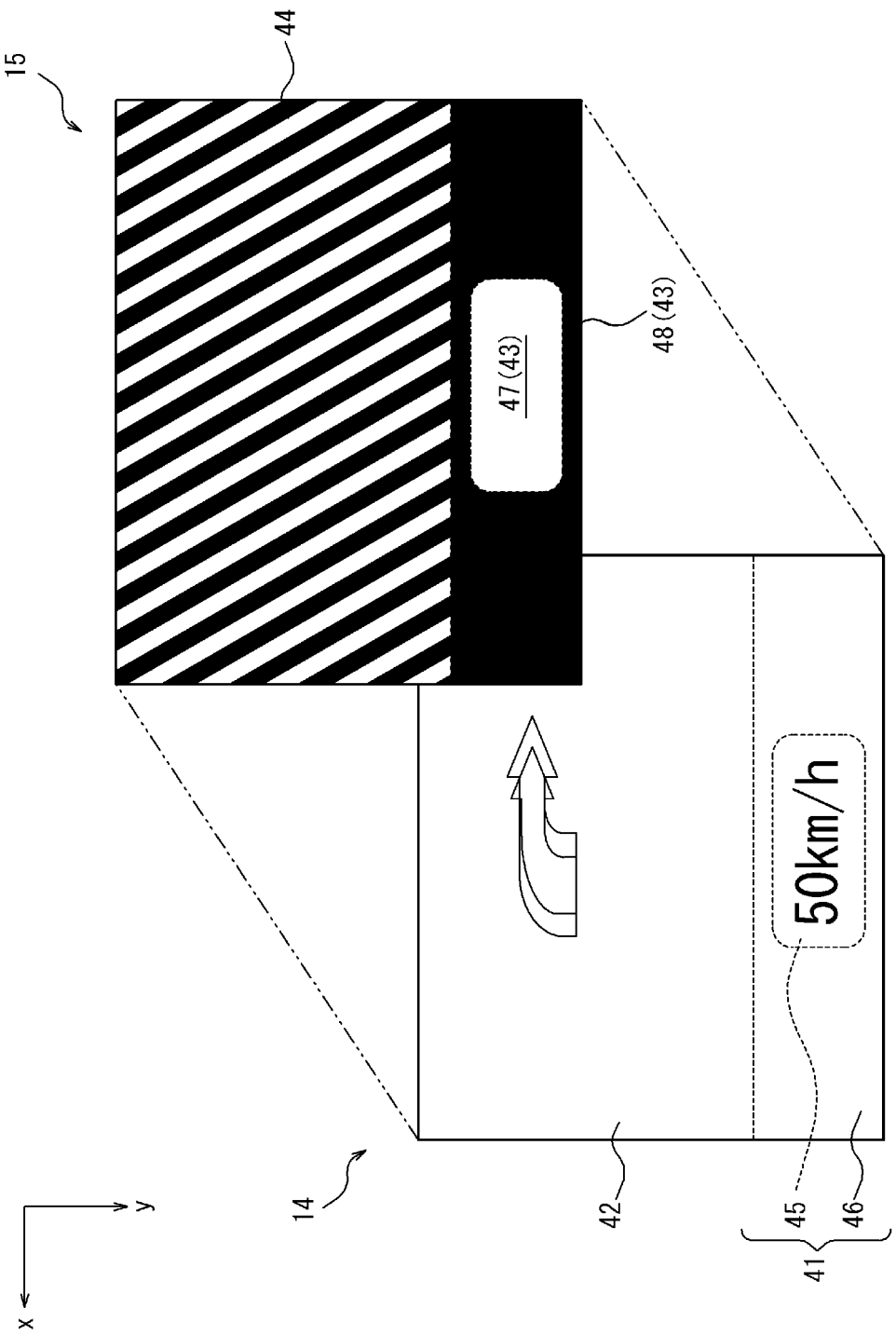

[Fig. 12]
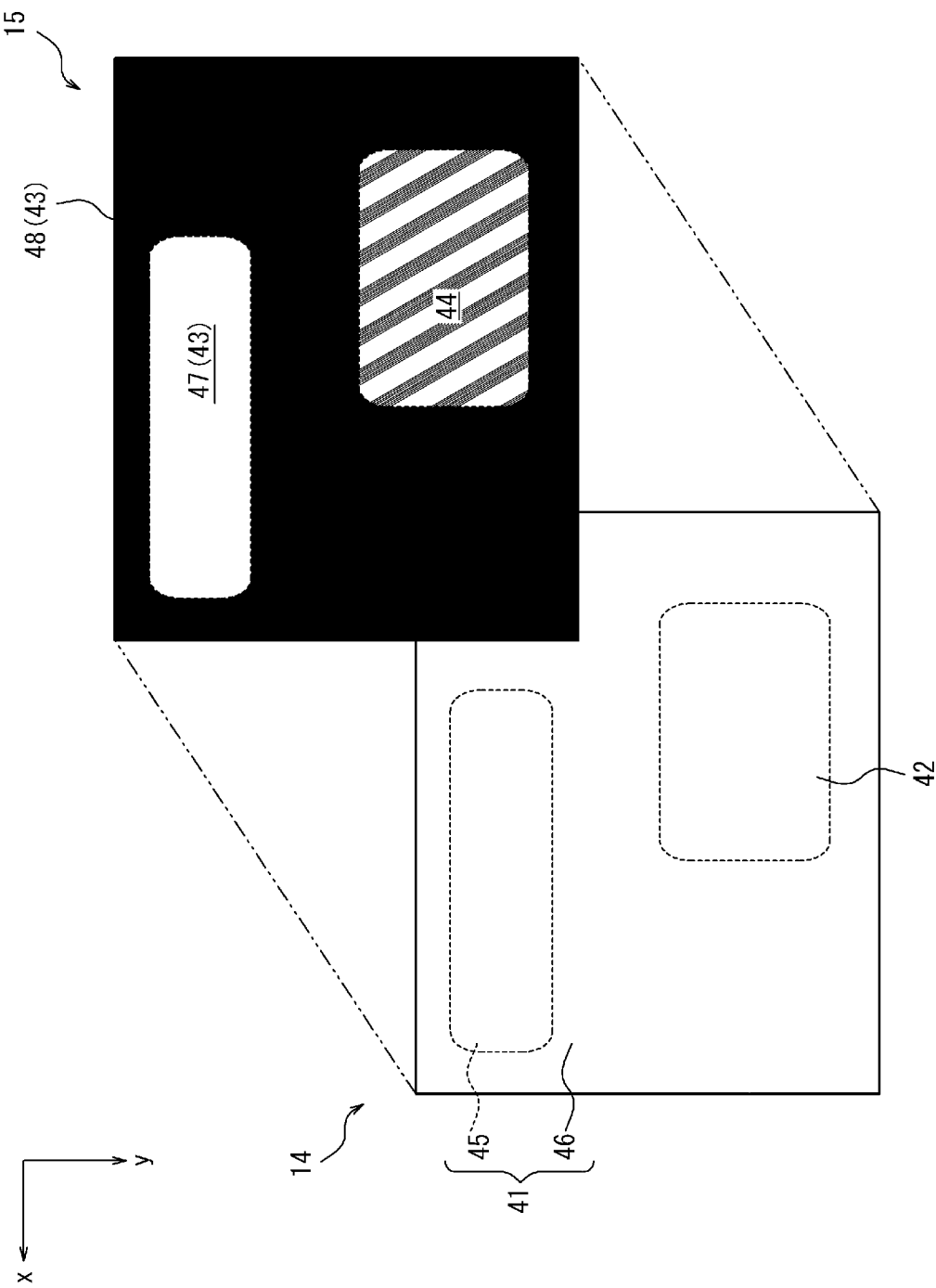

[Fig. 13]
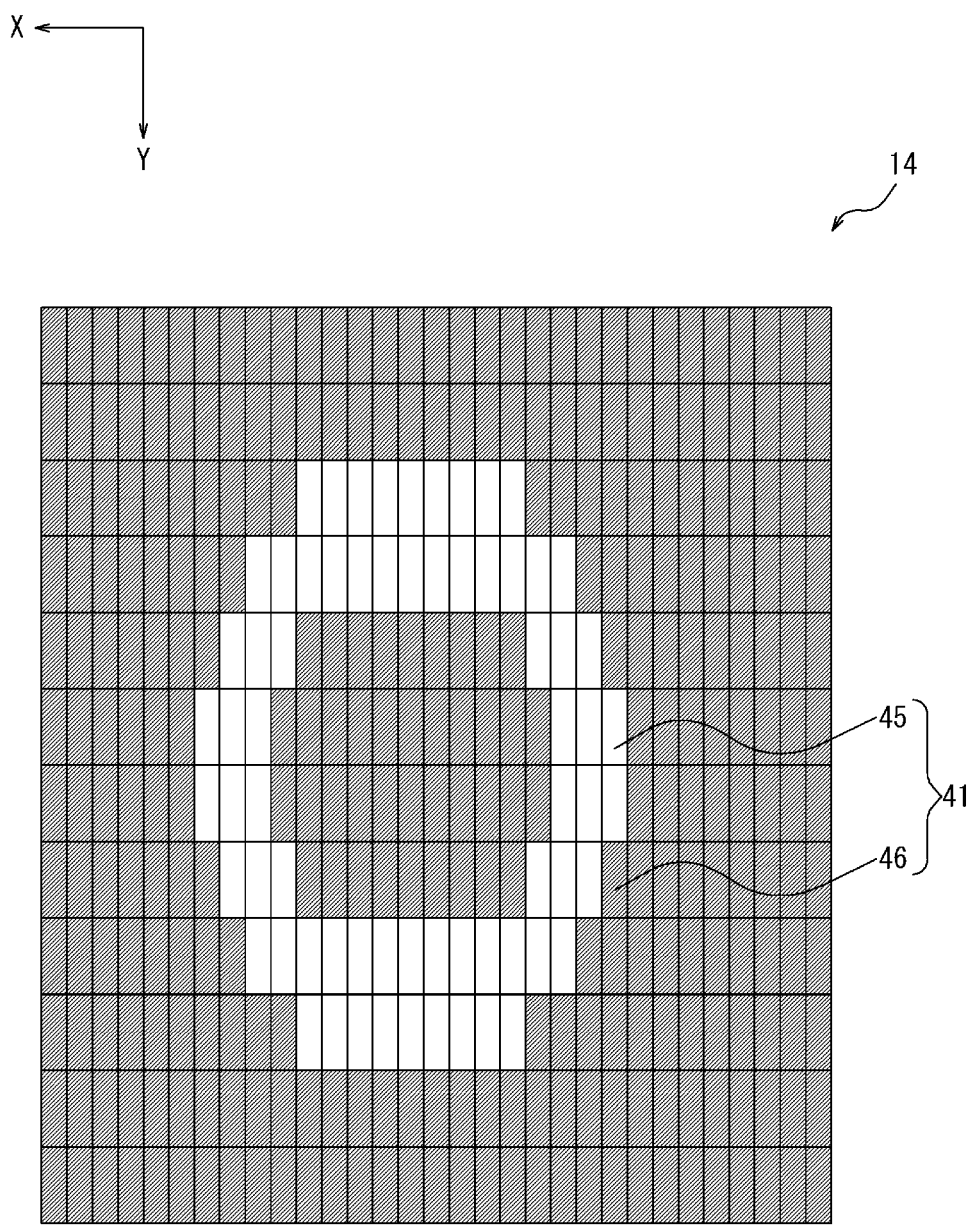

[Fig. 14]
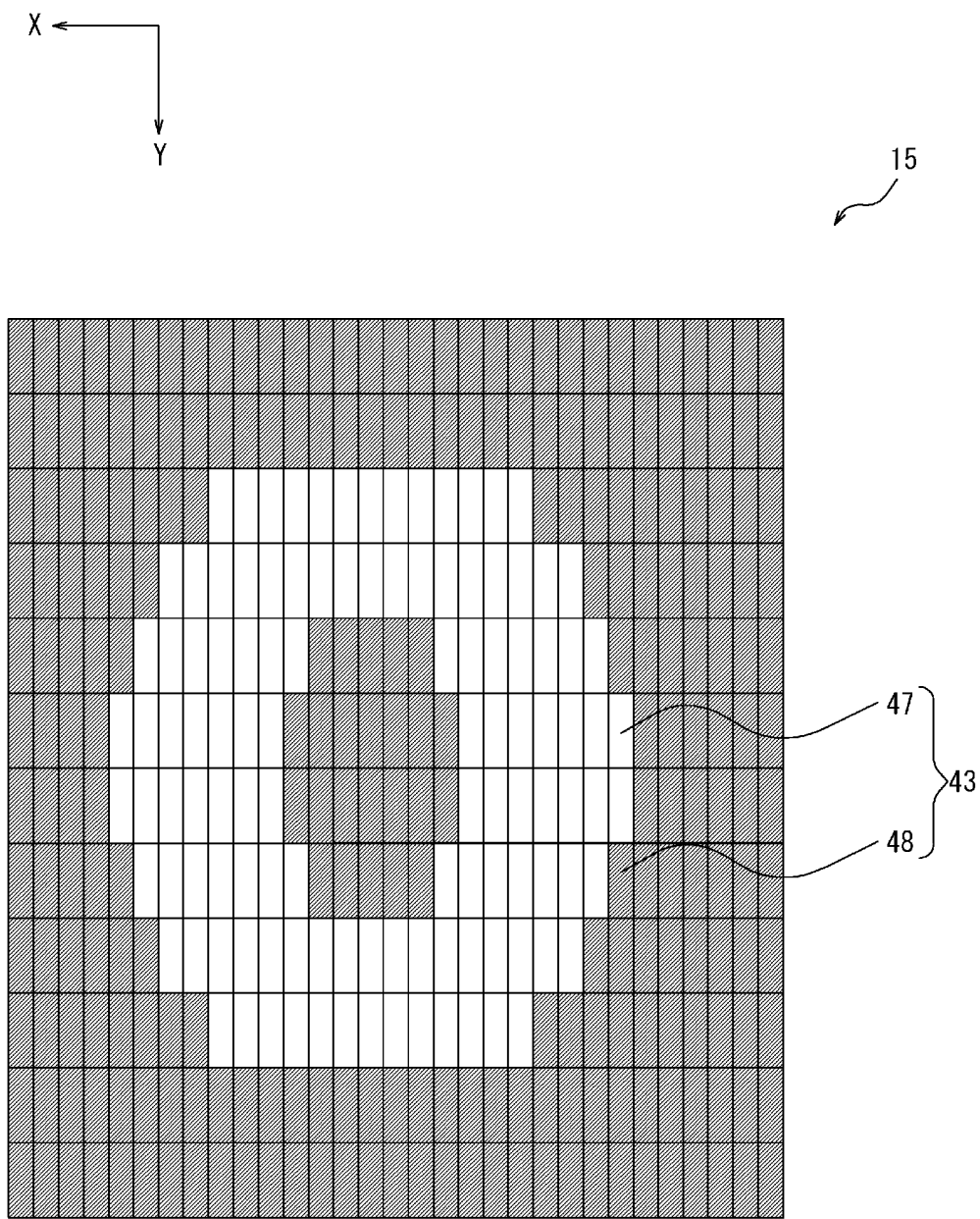

[Fig. 15]
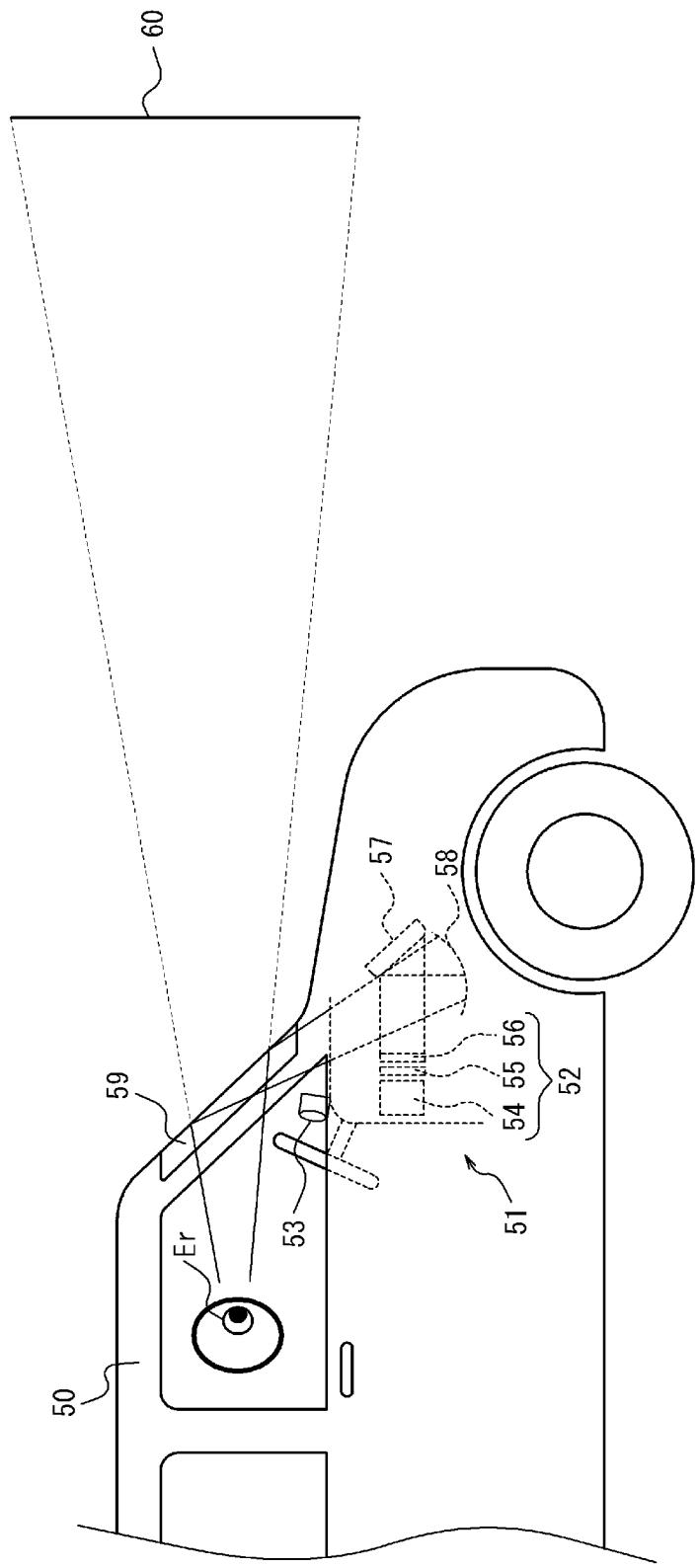

DISPLAY DEVICE, DISPLAY SYSTEM, AND MOVABLE VEHICLE

TECHNICAL FIELD

The present disclosure relates to a display device, a display system, and a movable vehicle.

CROSS REFERENCE TO RELATED APPLICATIONS

This application claims priority to and the benefit of Japanese Patent Applications No. 2018-141887 (filed on Jul. 27, 2018), the entire contents of which are incorporated herein by reference.

BACKGROUND ART

A known display device includes a liquid crystal panel, a parallax barrier located in front of or behind the liquid crystal panel, and an optical system for forming an enlarged virtual image to display an enlarged three-dimensional (3D) image (refer to, for example, Patent Literature 1). The parallax barrier described in Patent Literature 1 separates a display light of a parallax image displayed on a liquid crystal panel toward a left-eye image and a right-eye image to allow a user to view an enlarged virtual image stereoscopically. Such a display device may, e.g., be referred to as "static barrier type".

CITATION LIST

Patent Literature

PTL 1: Japanese Unexamined Patent Application Publication No. 7-287193

SUMMARY OF INVENTION

The present disclosure provides a display device as defined in claim 1, a display system as defined in claim 14, and a movable vehicle as defined in claim 15. Further embodiments of the display device of the present disclosure are described in the dependent claims. For example, the display device and/or the display system may be used as or may be implemented in a HUD (head-up display device), for example in a vehicle. Further exemplary aspects of the present disclosure are as follows.

A display device according to a first aspect of the present disclosure includes a first display panel, a second display panel, a controller, and an optical system. The first display panel includes first subpixels arranged in a grid in a first direction and a second direction. The first direction corresponds to a direction for causing parallax between left and right eyes of a user. The second direction is substantially perpendicular to the first direction. The second display panel includes second subpixels arranged in a grid in the first direction and the second direction. The plurality of second subpixels are arranged with the same pitch as the plurality of first subpixels. The controller controls and/or is configured to control the first subpixels and the second subpixels based on image data. The optical system projects and/or is configured to project an image displayed on the first display panel into a field of view of the user. The first display panel and the second display panel each include a transmissive display area. The first subpixels each overlap one of the second subpixels in a direction normal to the first display panel. For example, the first subpixels each may entirely overlap one of the second subpixels in a direction normal to the first display panel and/or the first subpixels each may be congruent to one of the second subpixels in a direction normal to the first display panel. The controller performs and/or is configured to perform switching between display modes including a first display mode for displaying a two-dimensional image on the first display panel and a second display mode for displaying a parallax image on the first display panel. The controller performs and/or is configured to perform switching of a drive mode of the second display panel between drive modes including a first drive mode corresponding to the first display mode and a second drive mode corresponding to the second display mode.

According to a second aspect, in the display device according to the first aspect of the present disclosure, the controller—in the second display mode—causes and/or is configured to cause third subpixels selected from the first subpixels to display an image for the left eye, causes and/or is configured to cause fourth subpixels selected from the first subpixels other than the first subpixels selected as the third subpixels to display an image for the right eye, and controls and/or is configured to control the second subpixels to operate in the second drive mode, and the controller—in the second drive mode—sets and/or is configured to set first areas including selected ones of the second subpixels to have a darker tone than second areas including selected ones of the second subpixels to attenuate at least a portion of image light passing through the third subpixels toward the right eye of the user through the first areas and to attenuate at least a portion of image light passing through the fourth subpixels toward the left eye of the user through the first areas.

According to a third aspect, in the display device according to the second aspect of the present disclosure, the second areas each continuously extend obliquely to the first direction and the second direction, and are periodically arranged in the first direction at predetermined intervals.

According to a fourth aspect, in the display device according to any of the second or the third aspect of the present disclosure, the controller—in the second drive mode—sets and/or is configured to set the first areas to have a darkest tone for the second subpixels.

According to a fifth aspect, the display device according to any of the second to the fourth aspect of the present disclosure further comprises an input unit configured to receive an input of positional information about the left and right eyes of the user, wherein in the second drive mode, the controller shifts and/or is configured to shift the first areas based on the positional information about the left and right eyes of the user received by the input unit.

According to a sixth aspect, the display device according to any of the second to the fourth aspect of the present disclosure further comprises an input unit configured to receive an input of positional information about the left and right eyes of the user, wherein in the second display mode, the controller shifts and/or is configured to shift the third subpixels and the fourth subpixels based on the positional information about the left and right eyes of the user received by the input unit.

According to a seventh aspect, in the display device according to any of the first to the sixth aspect of the present disclosure, the controller partially performs switching and/or is configured to partially perform switching (e.g. to perform partial switching) between the first display mode and the second display mode, and partially performs switching and/or is configured to partially perform switching (e.g. to perform partial switching) between the first drive mode and the second drive mode.

According to an eighth aspect, in the display device according to any of the first to the seventh aspect of the present disclosure, the controller displays and/or is configured to display the two-dimensional image in a third area on the first display panel, displays and/or is configured to display the parallax image in a fourth area different from the third area on the first display panel, and controls and/or is configured to control a fifth area on the second display panel corresponding to the third area to operate in the first drive mode and controls and/or is configured to control a sixth area on the second display panel corresponding to the fourth area to operate in the second drive mode.

According to a ninth aspect, in the display device according to any of the first to the eighth aspect of the present disclosure, the controller—in the first display mode—detects and/or is configured to detect an image display area and a non-image display area from the image data, causes and/or is configured to cause the first subpixels included in the first display panel to display an image based on the image data, and sets and/or is configured to set second subpixels corresponding to the non-image display area to have a darkest tone for the second subpixels.

According to a tenth aspect, the display device according to the ninth aspect of the present disclosure further comprises an input unit configured to receive an input of positional information about the left and right eyes of the user (e.g., the above input unit), wherein in the first drive mode, the controller shifts and/or is configured to shift (e.g. selects and/or is configured to select) the second subpixels corresponding to the non-image display area based on the positional information about the left and right eyes of the user received by the input unit.

According to a eleventh aspect, in the display device according to any of the first to the tenth aspect of the present disclosure, the first display panel includes a color filter corresponding to the first subpixels, and the second display panel includes no color filter.

A display device according to a twelfth aspect of the present disclosure includes a first display panel, a second display panel, a controller, and an optical system. The first display panel includes first subpixels arranged in a grid in a first direction and a second direction. The first direction corresponds to a direction for causing parallax between left and right eyes of a user. The second direction is substantially perpendicular to the first direction. The second display panel includes second subpixels arranged in a grid in the first direction and the second direction. The controller controls and/or is configured to control the first subpixels and the second subpixels based on image data. The optical system projects and/or is configured to project an image displayed on the first display panel into a field of view of the user. The first display panel and the second display panel are arranged to allow an output from the first display panel to enter the second display panel or to allow an output from the second display panel to enter the first display panel. The controller performs switching and/or is configured to perform switching between modes including a first display mode for displaying a two-dimensional image on the first display panel and a second display mode for displaying a parallax image on the first display panel. The controller performs switching and/or is configured to perform switching of a drive mode of the second display panel between modes including a first drive mode corresponding to the first display mode and a second drive mode corresponding to the second display mode. The controller controls and/or is configured to control a third area including first subpixels selected from the first subpixels included in the first display panel to operate in the first display mode and controls and/or is configured to control a fourth area including first subpixels other than the first subpixels included in the third area selected from the first subpixels included in the first display panel to operate in the second display mode. The controller controls and/or is configured to control a fifth area including second subpixels corresponding to the third area selected from the second subpixels included in the second display panel to operate in the first drive mode. The controller controls and/or is configured to control a sixth area including second subpixels corresponding to the fourth area selected from the second subpixels included in the second display panel to operate in the second drive mode.

According to a thirteenth aspect, in the display device according to any of the first to the twelfth aspect of the present disclosure, the optical system projects and/or is configured to project a virtual image of the first display panel into the field of view of the user.

A display system according to a fourteenth aspect of the present disclosure includes a display device and a detector. The display device includes a first display panel, a second display panel, a controller, and an optical system. The first display panel includes first subpixels arranged in a grid in a first direction and a second direction. The first direction corresponds to a direction for causing parallax between left and right eyes of a user. The second direction is substantially perpendicular to the first direction. The second display panel includes second subpixels arranged in a grid in the first direction and the second direction. The plurality of second subpixels are arranged with the same pitch as the plurality of first subpixels. The controller controls and/or is configured to control the first subpixels and the second subpixels based on image data. The optical system projects and/or is configured to project an image displayed on the first display panel into a field of view of the user. The first display panel and the second display panel each include a transmissive display area. The first subpixels each overlap one of the second subpixels in a direction normal to the first display panel. The controller performs and/or is configured to perform switching between display modes including a first display mode for displaying a two-dimensional image on the first display panel and a second display mode for displaying a parallax image on the first display panel. The controller performs and/or is configured to perform switching of a drive mode of the second display panel between drive modes including a first drive mode and a second drive mode. The first drive mode corresponds to the first display mode. The second drive mode corresponds to the second display mode. The detector detects and/or is configured to detect positions of the left and right eyes of the user. In the second drive mode, the controller controls and/or is configured to control at least one of the first display panel and the second display panel based on the positions of the left and right eyes of the user detected by the detector.

A movable vehicle according to a fifteenth aspect of the present disclosure includes a display device. The display device includes a first display panel, a second display panel, a controller, and an optical system. The first display panel includes first subpixels arranged in a grid in a first direction and a second direction. The first direction corresponds to a direction for causing parallax between left and right eyes of a user. The second direction is substantially perpendicular to the first direction. The second display panel includes second subpixels arranged in a grid in the first direction and the second direction. The plurality of second subpixels are arranged with the same pitch as the plurality of first subpixels. The controller controls and/or is configured to control the first subpixels and the second subpixels based on image data. The optical system projects and/or is configured to project an image displayed on the first display panel into a field of view of the user. The first display panel and the second display panel each include a transmissive display area. The first subpixels each overlap one of the second subpixels in a direction normal to the first display panel. The controller performs and/or is configured to perform switching between display modes including a first display mode for displaying a two-dimensional image on the first display panel and a second display mode for displaying a parallax image on the first display panel. The controller performs and/or is configured to perform switching of a drive mode of the second display panel between drive modes including a first drive mode corresponding to the first display mode and a second drive mode corresponding to the second display mode.

Further, according to embodiments of the present disclosure, there is provided a display device having a first display panel including first subpixels arranged in a grid in a first direction and a second direction, wherein a parallax barrier is/may be formed by a second display panel including second subpixels arranged in a grid in the first direction and the second direction (for example, this might form or may be referred to as an "active barrier type"). That is, a second display panel is provided which is configured to function as a parallax barrier, for example in a selective and/or controllable manner, for example selective and/or controllable as to time and/or as to a portion/an area of the second display panel. The display device may further comprise a controller configured to control the first subpixels and the second subpixels based on image data, and an optical system configured to project an image displayed on the first display panel into a field of view of the user.

Advantageous Effects of Invention

The display device and the display system according to the present disclosure are switchable between 3D image display and 2D image display, and the movable vehicle according to the above aspect includes the display device. For example, according to embodiments of the present disclosure, a 2D mode (2D image display) and a 3D mode (3D image display) may be provided in a flexible manner. For example, additionally or alternatively, according to embodiments of the present disclosure, a high contrast image may be provided, for instance at night (for example, this might be referred to as "mega-contrast"). For example, a display device or HUD module may use a high power back light, in which case a single LCD display might not be able to cut back light enough even at the black color levels thereof, whereas a display device of the active barrier type having a second display panel can cut the back light better/enough, using in total two (or more) display panels.

BRIEF DESCRIPTION OF DRAWINGS

FIG. 1 is a schematic diagram of a display device according to one embodiment.
FIG. 2 is an enlarged perspective view of a first display panel and a second display panel.
FIG. 3 is a diagram describing an example arrangement of first subpixels included in the first display panel.
FIG. 4 is a diagram describing an example display of second subpixels included in the second display panel in a first display mode.
FIG. 5 is a diagram describing three-dimensional image display in a second display mode.
FIG. 6 is a diagram describing an example display of the second subpixels included in the second display panel in the second display mode.
FIG. 7 is a diagram describing an example arrangement of third subpixels and fourth subpixels included in the first display panel in the second display mode.
FIG. 8 is a diagram describing a shifted arrangement of the third subpixels and the fourth subpixels based on the positions of a user's eyes.
FIG. 9 is a diagram describing a shifted arrangement of attenuation areas and transmissive areas on the second display panel based on the positions of the user's eyes.
FIG. 10 is a diagram describing a first example display method used in the display device.
FIG. 11 is a diagram describing a second example display method used in the display device.
FIG. 12 is a diagram describing a third example display method used in the display device.
FIG. 13 is a diagram showing examples of an image display area and a non-image display area.
FIG. 14 is a diagram showing examples of a seventh area and an eighth area corresponding to the areas in FIG. 13.
FIG. 15 is a diagram describing the location and the structure of the display device installed in a movable vehicle.

DESCRIPTION OF EMBODIMENTS

A known display device including a parallax barrier is used only for displaying 3D images. In some situations, however, a two-dimensional (2D) image is to be displayed in the same area as a 3D image. A single display device switchable between 3D image display and 2D image display can improve convenience.

In response to this, one or more aspects of the present disclosure are directed to a display device and a display system switchable between 3D image display and 2D image display, and to a movable vehicle including the display device.

Embodiments of the present disclosure will now be described with reference to the drawings. The drawings referred to hereafter are schematic and are not drawn to scale relative to the actual size of each component.

A display system 10 according to one embodiment of the present disclosure includes a display device 11 and a detector 12 as shown in FIG. 1. In FIG. 1, the display system 10 is viewed from above a user who watches an image through the display system 10. The detector 12 detects and/or is configured to detect the positions of the left and right eyes El and Er of the user. The detector 12 outputs and/or is configured to output positional information about the user's left and right eyes El and Er to the display device 11. The display device 11 displays and/or is configured to display an image in accordance with the positional information about the user's left and right eyes El and Er. The structure of each component of the display system 10 will now be described in more detail.

Display Device

The display device 11 according to one embodiment of the present disclosure includes an illuminator 13, a first display panel 14, a second display panel 15, a controller 16, an input unit 17, a display information obtaining unit 18, and an optical system 19.

In one embodiment, the illuminator 13, the first display panel 14, and the second display panel 15 are arranged in the stated order from the far side from the user along an optical path of the image light from the image displayed for the user. For example, the illuminator 13, the first display panel 14, and the second display panel 15 are arranged in the stated order in a positive z-direction.

The illuminator 13 is configured to illuminate a surface of the first display panel 14, e.g. a surface of the first display panel 14 in the negative z-direction. The illuminator 13 may include a light source, a light guide plate, a diffuser plate, and a diffuser sheet. The illuminator 13 emits illumination light using the light source, and spreads the illumination light uniformly for illuminating the surface of the first display panel 14 using its components including the light guide plate, the diffuser plate, and the diffuser sheet. The illuminator 13 outputs the uniform light toward the first display panel 14.

FIG. 2 is an enlarged view of the first display panel 14 and the second display panel 15. The first display panel 14 may be a transmissive liquid crystal display panel or another display element. The first display panel 14 may have the structure of a known liquid crystal panel. The known liquid crystal panel herein may be an in-plane switching (IPS) panel, a fringe field switching (FFS) panel, a vertical alignment (VA) panel, an electrically controlled birefringence (ECB) panel, or any of various other liquid crystal panels. The first display panel 14 may include a liquid crystal layer 14a, two glass substrates 14b and 14c separated (e.g. separated in the z-direction) by the liquid crystal layer 14a, and a color filter 14d located between the liquid crystal layer 14a and the glass substrate 14c. A display area on the first display panel 14 to display an image is expected to be located (e.g. is located) around the interface between (e.g.—with regard to the z-direction—between) the liquid crystal layer 14a and the color filter 14d (e.g. to be located in a vicinity of the interface, with regard to the z-direction, between the liquid crystal layer 14a and the color filter 14d and extending in a x-y-plane). The display area on the first display panel 14 to display an image may be referred to as an active area on the display device 11. In the active area, an actually displayed image appears. The first display panel 14 may further include alignment films, transparent electrodes, and polarizer plates. The arrangement and the structures of the alignment films, the transparent electrodes, and the polarizer plates are known as those for typical liquid crystal panels, and will not be described. The first display panel 14 may eliminate (e.g. omit) the color filter 14d. The display device 11 may be a monochrome display device.

FIG. 3 is an enlarged partial view of the first display panel 14 as viewed from the second display panel 15 (e.g. as viewed in the negative z-direction). The display area in the first display panel 14 includes first subpixels 21 arranged in a grid in a first direction (x-direction) and a second direction intersecting with the first direction. The second direction may be substantially perpendicular to the first direction (e.g. the first direction and the second direction may enclose an angle of 90°+/−15°, for example an angle of 90°+/−10°, for example an angle of 90°+/−5°). The first direction (x-direction) corresponds to a parallax direction for causing parallax between the two eyes of the user. The first direction may be a horizontal or right-left direction as viewed from the user along the optical path of image light. The second direction may be a vertical or up-down direction as viewed from the user along the optical path of the image light. The first direction will be referred to as x-direction. The second direction will be referred to as y-direction. In the figures, x-direction is leftward and y-direction is downward as viewed in the direction from the second display panel 15 to the illuminator 13 (e.g. as viewed in the negative z-direction). The direction perpendicular to x-direction and y-direction and along the optical path toward the user's eyes will be referred to as z-direction.

The first subpixels 21 are arranged in a grid in x-direction and y-direction. In one embodiment, each first subpixel 21 is longer in y-direction than in x-direction. Each first subpixel 21 has one of the colors red (R), green (G), and blue (B) in correspondence with a color arrangement of the color filter 14d. A set of three first subpixels 21 colored R, G, and B may form one pixel 22. In FIG. 3, the dotted line indicates one pixel 22 for ease of explanation. Each pixel 22 may have a length ratio of, but not limited to, 1:1 in x-direction and y-direction, in other words, each first subpixel 21 may have a length ratio of, but not limited to, 1:3 in x-direction and y-direction. In this example, x-direction is the direction in which sets of first subpixels 21 each forming one pixel 22 are arranged, and y-direction is the direction in which first subpixels 21 having the same color are arranged.

The first display panel 14 may be other than a transmissive display panel, or may be, for example, a self-luminous display panel. The transmissive display panel may be a micro-electromechanical systems (MEMS) shutter display panel, in addition to a liquid crystal panel. A self-luminous display panel may be an organic electro-luminescence (EL) display panel or an inorganic EL display panel. When the first display panel 14 is a self-luminous display panel, the illuminator 13 is eliminated (e.g. omitted).

The second display panel 15 may be a display element having a transmissive display area. The second display panel 15 is arranged to receive the output (e.g. output light) from the first display panel 14. The second display panel 15 may be a liquid crystal panel. As shown in FIG. 2, the second display panel 15 includes a liquid crystal layer 15a and glass substrates 15b and 15c separated (e.g. separated in the z-direction) by the liquid crystal layer 15a. Unlike the first display panel 14, the second display panel 15 includes no color filter. The second display panel 15 without a color filter has a less decrease in the luminance of the displayed image. The display area on the second display panel 15 is expected to be located (e.g. is located) around the interface between (e.g., with regard to the z-direction, between) the liquid crystal layer 15a and the glass substrate 15c (e.g. to be located in a vicinity of the interface, with regard to the z-direction, between the liquid crystal layer 15a and the glass substrate 15c and extending in a x-y-plane).

As shown in FIG. 4, the second display panel 15 includes second subpixels 23 arranged in a grid in x-direction and y-direction. The second subpixels 23 may be arranged with the same pitch as the first subpixels 21. In this case, a horizontal pitch Hp and a vertical pitch Vp of the second subpixels 23 are the same as a horizontal pitch Hp and a vertical pitch Vp of the first subpixels 21. The first display panel 14 and the second display panel 15 may be arranged to face each other to have the first subpixels 21 each overlapping (e.g. each entirely overlapping, e.g. each being congruent to) one of the second subpixels 23 as viewed in a direction normal to the first display panel 14. The first display panel 14 and the second display panel 15 can thus be produced easily by using display panels with the same shape and the same dimensions. Also, the first subpixels 21 included in the first display panel 14 and the second subpixels 23 included in the second display panel 15 are arranged in one-to-one correspondence with each other. This reduces the computation for displaying an image and allows easy control by the controller 16. However, the second subpixels 23 may have a pitch different from the pitch of the first subpixels 21. For example, the second subpixels 23 may be sized differently from the first subpixels 21 to reflect different image magnifications used by the optical system 19 for the first display panel 14 and the second display panel 15 (e.g. the second subpixels 23 may be scaled with regard to the first subpixels 21, e.g. the second subpixels 23 may be uniformly scaled with regard to the first subpixels 21).

The second display panel 15 is spaced from the first display panel 14 by a predetermined distance in z-direction. The first display panel 14 and the second display panel 15 may be integral with each other. For example, the first display panel 14 and the second display panel 15 may be fixed together using an optically transparent adhesive. The optically transparent adhesive includes an optical clear adhesive (OCA).

The second display panel 15 may change the transmittance of image light for each second subpixel 23. The second display panel 15 may transmit and/or be configured to transmit the image light passing through a specified area without greatly reducing the light intensity, while attenuating the image light passing through another specified area. Attenuating the image light herein includes transmitting substantially no light, or blocking the light. The second display panel 15 may have the lightest tone in the second subpixels 23 in the area transmitting light, and the darkest tone of the second subpixels 23 in the area attenuating the light. The tone of each second subpixel 23 corresponds to light transmittance. The lightest tone corresponds to the highest light transmittance. The darkest tone corresponds to the lowest light transmittance. The second display panel 15 can set visible-light transmittance (e.g. light transmittance) varying 100 times or more, for example, about 1,000 times, between the transmissive area for transmitting light and the attenuation area for attenuating light.

The controller 16 is connected to the components of the display system 10 and controls and/or is configured to control the components. The controller 16 may be, for example, a processor. The controller 16 may include one or more processors. The processors may include a general-purpose processor that is configured to perform a particular function by reading a particular program and a processor dedicated to particular processing. The dedicated processor may include an application specific integrated circuit (ASIC). The processor may include a programmable logic device (PLD). The PLD may include a field-programmable gate array (FPGA). The controller 16 may either be a system-on-a-chip (SoC) or a system in a package (SiP) in which one or more processors cooperate with other components. The controller 16 may include a storage unit for storing various information sets or a program for causing each component of the display system 10 to operate. The storage unit may be, for example, a semiconductor memory. The storage unit may function as a work memory of the controller 16.

The controller 16 controls and/or is configured to control the first subpixels 21 included in the first display panel 14 and the second subpixels 23 included in the second display panel 15 based on image data. The image data may be obtained from the display information obtaining unit 18 described later. The controller 16 may internally generate the image data based on information obtained from the display information obtaining unit 18. The image data may include, for example, characters and symbols. The image data includes two-dimensional (2D) image data and parallax image data for displaying a three-dimensional (3D) image.

The controller 16 performs switching and/or is configured to preform switching between multiple display modes. The multiple display modes includes a first display mode for displaying a 2D image and a second display mode for displaying a parallax image on the first display panel 14. The controller 16 may perform switching and/or be configured to perform switching between multiple drive modes including a first drive mode corresponding the first display mode and a second drive mode corresponding to the second display mode on the second display panel 15. The display mode switching performed by the controller 16 will be described later.

The input unit 17 may receive and/or be configured to receive positional information about the user's left and right eyes El and Er from the detector 12. The input unit 17 may include an electric connector or an optical connector to receive an electric signal or an optical signal from the detector 12.

The display information obtaining unit 18 obtains and/or is configured to obtain information to be displayed on the display device 11 from another device. For example, the display information obtaining unit 18 may obtain and/or be configured to obtain information to be displayed from an image playback device for playing a prestored image. The display information obtaining unit 18 may obtain and/or be configured to obtain information to be displayed through an external wireless communication line. For the display system 10 to be installed in a vehicle, for example, the display information obtaining unit 18 may obtain and/or be configured to obtain information to be displayed from an in-vehicle electronic control unit (ECU).

The optical system 19 projects and/or is configured to project an image displayed on the first display panel 14 into the field of view of the user. The optical system 19 may include at least one of a reflective optical element and a refractive optical element with a positive refractive power. The controller 16 controls and/or is configured to control the first display panel 14 and the second display panel 15 based on the image magnifications used by the optical system 19 for the first display panel 14 and the second display panel 15 relative to the positions of the user's left and right eyes El and Er.

In one embodiment, the optical system 19 projects and/or is configured to project an image to allow the first subpixels 21 and the second subpixels 23 facing the first subpixels 21 to have the same pitch (e.g. the same horizontal pitch and the same vertical pitch) within the field of view of the user who views the image from an optimum viewing distance. In this case, although the first display panel 14 is farther than the second display panel 15 from the user, the display area on the first display panel 14 and the display area on the second display panel 15 each having the subpixels arranged in the same manner constitute the same view range. The optical system 19 satisfying such conditions may be designed based on geometrical optics.

This optical system 19 facilitates such correspondence between the first subpixels 21 and the second subpixels 23. Thus, the controller 16 can be simplified to reduce the processing load.

Detector

The detector 12 detects and/or is configured to detect the positions of the user's eyes and outputs the information to the input unit 17 in the display device 11. The detector 12 may include a camera. The detector 12 may capture and/or is configured to capture an image of the user's face with the camera. The detector 12 may detect and/or is configured to detect the position of at least one of the left and right eyes El and Er from the image captured with the camera. The detector 12 may detect and/or is configured to detect, from the image captured with one camera, the position of at least one of the left and right eyes El and Er as the coordinates in a 3D space. The detector 12 may detect and/or is configured to detect, from the images captured with two or more cameras, the position of at least one of the left and right eyes El and Er as the coordinates in a 3D space.

The detector 12 may include no camera, and may be (e.g. but may instead be) connected to an external camera. The detector 12 may include an input terminal for receiving a signal from an external camera. An external camera may be directly connected to the input terminal. An external camera may be indirectly connected to the input terminal through a shared network. The detector 12 including no camera may include an input terminal for receiving an image signal from a camera. The detector 12 including no camera may detect the position of at least one of the left and right eyes El and Er from the image signal input to the input terminal.

The detector 12 may include a sensor in place of a camera. The sensor may be, for example, an ultrasonic sensor or an optical sensor. The detector 12 may detect and/or be configured to detect the position of the head of the user with the sensor, and estimate and/or be configured to estimate the position of at least one of the left and right eyes El and Er based on the position of the head. The detector 12 may detect and/or be configured to detect, with one sensor or two or more sensors, the position of at least one of the left and right eyes El and Er as the coordinates in a 3D space.

When detecting the position of one of the left and right eyes El and Er, the detector 12 may estimate the position of the other eye from prestored user's inter-eye distance information or prestored typical inter-eye distance information. The position of the other eye may be estimated by the controller 16 rather than by the detector 12.

When the position of the display device 11 is substantially fixed relative to the user's left and right eyes El and Er, the detector 12 may be eliminated (e.g. omitted). In this case, the input unit 17 is also eliminated (e.g. omitted).

First Display Mode

In the first display mode, the display device 11 displays and/or is configured to display a 2D image on the first subpixels 21 in the first display panel 14. The 2D image may be a color image. In the first display mode, the second display panel 15 is operated in the first drive mode by the controller 16 without attenuating or blocking the image light from the first display panel 14.

In the first drive mode, the second display panel 15 may set, for all the second subpixels 23, the lightest tone or a tone substantially equivalent to the lightest tone. In this case, the lightest tone of each second subpixel 23 indicates a tone with the highest transmittance of image light from the first display panel 14. Also, the darkest tone of each second subpixel 23 described below indicates a tone with the lowest transmittance of image light from the first display panel 14. In FIG. 4, all the second subpixels 23 have the lightest tone. The second subpixels 23 transmit and/or is configured to transmit the image light from the image displayed on the first display panel 14 (e.g. in the positive z-direction).

The second subpixels 23 may be operated in the first display mode with a driving method different from the method described above. For example, the second subpixels 23 may have the lightest tone in an area corresponding to an area on the first display panel 14 displaying an image, and the darkest tone in an area corresponding to an area on the first display panel 14 displaying no image.

Second Display Mode

In the second display mode, an image is displayed as a 3D image viewable by the user. To properly display a 3D image, the distance from the first display panel 14 to the user's left and right eyes El and Er is set to an optimum viewing distance, which causes minimum crosstalk for a parallax image viewed through the display device 11. In this case, crosstalk refers to a phenomenon in which an image for the right eye Er is viewed by the left eye El and/or an image for the left eye El is viewed by the right eye Er.

In the second display mode for displaying a 3D image, the second display panel 15 is operated in the second drive mode by the controller 16. In the second drive mode, the second display panel 15 functions and/or is configured to function as an optical element that defines the light ray directions of the image light from the first subpixels 21. As shown in FIGS. 5 and 6, the second subpixels 23 included in attenuation areas (first areas) 31 on the second display panel 15 are controlled by the controller 16 to have a darker tone than the second subpixels 23 included in transmissive areas (second areas) 32. The second subpixels 23 included in the attenuation areas 31 on the second display panel 15 may be set to have the darkest tone. The second subpixels 23 included in the transmissive areas 32 are set to have a light tone by the controller 16. The second subpixels 23 included in the transmissive areas 32 may be set to have the lightest tone. The second subpixels 23 included in the attenuation areas 31 may have a light transmittance of one hundredth or less than the light transmittance of the second subpixels 23 included in the transmissive areas 32.

As shown in FIG. 6, the attenuation areas 31 and the transmissive areas 32 each extend in one direction (e.g. in one direction with a component in the x-direction and a component in the y-direction). The attenuation areas 31 and the transmissive areas 32 are arranged alternately (e.g. alternately in the x-direction). The attenuation areas 31 each have substantially the same width and are arranged periodically at predetermined intervals in x-direction. The transmissive areas 32 each have substantially the same width and are arranged periodically at predetermined intervals in x-direction. The attenuation areas 31 and the transmissive areas 32 may together be arranged periodically. The attenuation areas 31 and the transmissive areas 32 on the second display panel 15 define the viewable range of the image light from the first subpixels 21 included in the first display panel 14 for each of the left and right eyes El and Er. Each attenuation area 31 may have the same width as or a greater width than each transmissive area 32 in x-direction.

The attenuation areas 31 and the transmissive areas 32 may continuously extend in one direction except x-direction (e.g. in one direction except in a direction having only a x-component and no y-component). The attenuation areas 31 and the transmissive areas 32 (e.g. the attenuation areas 31 and the transmissive areas 32 together) define a parallax barrier. The direction in which the attenuation areas 31 and the transmissive areas 32 extend may be oblique (e.g. inclined with regard) to x-direction and y-direction (e.g. may be a direction with a non-zero x-component and a non-zero y-component). The direction in which the attenuation areas 31 and the transmissive areas 32 extend has an angle with respect to y-direction that may be referred to as a barrier inclination angle. The barrier inclination angle may be greater than 0 degrees and smaller than 90 degrees. If the attenuation areas 31 and the transmissive areas 32 are arranged in y-direction (i.e. corresponding to a barrier inclination angle of 0 degrees), the displayed image is likely to contain recognizable moire due to errors in the dimensions and/or the arrangement of the first subpixels 21 and/or the second subpixels 23. For the attenuation areas 31 and the transmissive areas 32 with a barrier inclination angle other than 0 degrees, the displayed image is less likely to contain recognizable moire although having errors in the dimensions and/or the arrangement of the first subpixels 21 and/or the second subpixels 23.

In the second display mode, the second display panel 15 attenuates at least a portion of image light from the first display panel 14 depending on the position through which the image light enters the second display panel 15. The second display panel 15 transmits and/or is configured to transmit another portion of image light from the first display panel 14 depending on the position through which the image light enters the second display panel 15. The second display panel 15 thus defines the light ray directions of the image light from the first display panel 14.

In the second display mode for displaying a 3D image, the display device 11 displays and/or is configured to transmit a parallax image on the first subpixels 21 included in the first display panel 14. The parallax image includes images for the left eye El and the right eye Er, which have parallax between them. As shown in FIG. 5, image light from third subpixels 33 selected from (the) first subpixels 21 in the first display panel 14 reaches the user's left eye El. The third subpixels 33 thus display and/or are configured to display an image for the left eye El in the state shown in FIG. 5. Image light from fourth subpixels 34 selected from the first subpixels 21 in the first display panel 14 reaches the user's right eye Er. Thus, the fourth subpixels 34 display and/or are configured to display an image for the right eye Er. These images allow the user to recognize a 3D image. Although the image light rays passing through the optical system 19 are linear in FIG. 5, the actual image light rays passing through the optical system 19 may be refracted or reflected by the optical elements in the optical system 19.

In one example, the third subpixels 33 displaying an image for the left eye El and the fourth subpixels 34 displaying an image for the right eye are arranged on the first display panel 14 as shown in FIG. 7. In FIG. 7, the first subpixels 21 are numbered 1 to 6 for ease of explanation. The first subpixels 21 with the same number are collectively set to either the third subpixels 33 or the fourth subpixels 34. As described later, the first subpixels 21 are switchable between the third subpixels 33 and the fourth subpixels 34 (e.g. switchable so as to be set as the third subpixels 33 or the fourth subpixels 34). The first subpixels 21 with the same number switch and/or are configured to switch together at the same time. In the example shown in FIG. 7, first subpixels 21 numbered 1 to 3 are selected as the third subpixels 33, and first subpixels 21 numbered 4 to 6 are selected as the fourth subpixels 34. The third subpixels 33 and the fourth subpixels 34 are arranged obliquely to y-direction (e.g. inclined with regard to the y-direction) at an angle corresponding to the barrier inclination angle of the parallax barrier formed with the attenuation areas 31 and the transmissive areas 32 on the second display panel 15.

In FIG. 7, left eye viewable areas 35 on the first display panel 14 viewable by the user's left eye El through the transmissive areas 32 on the second display panel 15 at least partially include the third subpixels 33. The areas on the first display panel 14 viewable by the user's left eye El may include half the third subpixels 33 or more. In this case, areas on the first display panel 14 unviewable by the user's right eye Er due to the light attenuation with the attenuation areas 31 on the second display panel 15 at least partially include the third subpixels 33. Right eye viewable areas 36 on the first display panel 14 viewable by the user's right eye Er through the transmissive areas 32 on the second display panel 15 at least partially include the fourth subpixels 34. The areas on the first display panel 14 viewable by the user's right eye Er may include half (e.g. half (the amount) of) the fourth subpixels 34 or more. In this case, areas on the first display panel 14 unviewable by the user's left eye El due to the light attenuation with the attenuation areas 31 on the second display panel 15 at least partially include the fourth subpixels 34. When the attenuation areas 31 and the transmissive area 32 on the second display panel 15 include the same number of second subpixels 23 in x-direction, the left eye viewable areas 35 substantially align with the areas unviewable by the right eye Er, and the right eye viewable areas 36 substantially align with the areas unviewable by the left eye El.

When the user watches a parallax image, his or her left and right eyes El and Er may shift (e.g. move, e.g. be moved). As the user's eyes shift (e.g. move, e.g. are moved), the positions of the areas viewable by the left eye El and the positions of the areas viewable by the right eye Er may also shift accordingly on the first display panel 14. For example, when the user shifts the eyes leftward (in the positive x-direction) relative to the first display panel 14, the attenuation areas 31 and the transmissive areas 32 on the second display panel 15 as viewed from the user's eyes visually shift rightward (in the negative x-direction) relative to the first display panel 14.

As the attenuation areas 31 and the transmissive areas 32 visually shift rightward relative to the first display panel 14, the third subpixels 33 numbered 1 in FIG. 7 are unviewable by the user's left eye El, but are viewable by the user's right eye Er, causing crosstalk. In the same manner, the fourth subpixels 34 numbered 4 in FIG. 7 are unviewable by the user's right eye Er, but are viewable by the user's left eye El, causing crosstalk.

In this case, the controller 16 may obtain and/or be configured to obtain, through the input unit 17, the positions of the user's eyes detected by the detector 12, and shift, based on the positions (e.g. the shifted positions) of the user's eyes, the third subpixels 33 and the fourth subpixels 34 to minimize the crosstalk. In the example shown in FIG. 8, selected ones of the first subpixels 21 are switched to the third subpixels 33 or to the fourth subpixels 34 from the positions shown in FIG. 7. In the example shown in FIG. 8, the controller 16 switches and/or is configured to switch the third subpixels 33 numbered 1 to the fourth subpixels 34 and the fourth subpixels 34 numbered 4 to the third subpixels 33. In other words, the controller 16 sets and/or is configured to set the first subpixels 21 numbered 2 to 4 as the third subpixels 33 for displaying the image for the left eye El. Also, the controller 16 sets and/or is configured to set the first subpixels 21 numbered 5, 6, and 1 to the fourth subpixels 34 for displaying the image for the right eye Er. The left eye viewable areas 35 and the right eye viewable areas 36 are thus shifted in the negative x-direction as a whole. This structure allows the user shifting the eyes relative to the first display panel 14 to view an intended parallax image on the first display panel 14. In other words, the user can continuously (e.g. continuously also while he or she moves/shifts his or her eyes) view the image viewable as a 3D image.

Unlike with the above method, to respond to the shift of the left and right eyes El and Er of the user watching a parallax image, the controller 16 may shift and/or be configured to shift the attenuation areas 31 and the transmissive areas 32 displayed on the second display panel 15. For example, when the user shifts the left and right eyes El and Er leftward (in the positive x-direction) relative to the first display panel 14, the attenuation areas 31 and the transmissive areas 32 may be shifted leftward, as shown in FIG. 9, from the positions shown in FIG. 6.

As described above, the display system 10 and the display device 11 according to the present disclosure have the first display mode for displaying a 2D image and the second display mode for displaying a parallax image on the first display panel 14. In the first display mode, the controller 16 operates and/or is configured to operate the second display panel 15 in the first drive mode to allow transmission of the image light (e.g. transmission of the image light with a minimal attenuation by setting the lightest possible tone). In the second display mode, the controller 16 operates and/or is configured to operate the second display panel 15 in the second drive mode to define the traveling direction of the image light from a parallax image. The display system 10 and the display device 11 can thus display a 2D image and a 3D image in a switchable manner with a single device.

Partially Displaying 2D Image and 3D Image

In one embodiment of the present disclosure, the display system 10 and the display device 11 display and/or are configured to display a 2D image and a 3D image together (e.g. at the same time). A 2D image and a 3D image are each displayed in one area of the display device 11. FIG. 10 is a diagram describing an example of display on the first display panel 14 and the second display panel 15.

In FIG. 10, the first display panel 14 includes a third area 41 for displaying a 2D image and a fourth area 42 for displaying a parallax image. The second display panel 15 includes a fifth area 43 corresponding to the third area 41. The fifth area 43 includes selected ones of the second subpixels 23. The fifth area 43 is operated in the first drive mode. The second display panel 15 includes a sixth area 44 corresponding to the fourth area 42. The sixth area 44 includes selected ones of the second subpixels 23. The sixth area 44 is operated in the second drive mode. The fifth area 43 on the second display panel 15 may face the third area 41 on the first display panel 14. The sixth area 44 on the second display panel 15 may face the fourth area 42 on the first display panel 14.

In the first drive mode, the fifth area 43 may have all the second subpixels 23 in a light tone to transmit a 2D image. In the fifth area 43, the second subpixels 23 may have the lightest tone. In the second drive mode, as described with reference to FIG. 6, the sixth area 44 includes the attenuation areas 31 in a relatively dark tone and the transmissive areas 32 in a relatively light tone. These areas extend in a predetermined direction. The sixth area 44 allows the image on the third subpixels 33 in the parallax image displayed on the fourth area 42 to reach the user's left eye El. The sixth area 44 allows the image on the fourth subpixels 34 in the parallax image displayed on the fourth area 42 to reach the user's right eye Er.

The controller 16 controls and/or is configured to control 2D image display on the third area 41 on the first display panel 14 in the first display mode and parallax image display on the fourth area 42 on the first display panel 14 in the second display mode. The controller 16 operates and/or is configured to operate the fifth area 43 on the second display panel 15 in the first drive mode. The controller 16 operates and/or is configured to operate the sixth area 44 on the second display panel 15 in the second drive mode.

For the display device 11 in the example shown in FIG. 10 to be installed in a vehicle, the third area 41 shows the speed of the vehicle displayed as a 2D image, and the fourth area 42 shows arrows indicating the turning direction ahead in the traveling direction displayed as a parallax image recognizable as a 3D image. The user can perceive, from the 3D image, the approximate distance to the point ahead to turn right.

In one embodiment, in the first display mode, the controller 16 analyzes and/or is configured to analyze image data obtained from the display information obtaining unit 18, and detects and/or is configured to detect an image display area 45 displaying an image and a non-image display area 46 displaying no image within the third area 41. FIG. 11 shows an example including the image display area 45 and the non-image display area 46. In FIG. 11, the image display area 45 displays speed information indicating 50 km/h. In FIG. 11, the non-image display area 46 includes no information to display. The image display area 45 and the non-image display area 46 may be determined by various methods. The controller 16 may determine and/or be configured to determine whether to display an image for each first subpixel 21, and determine and/or be configured to determine the image display area 45 and the non-image display area 46.

The fifth area 43 on the second display panel 15 includes a seventh area 47 corresponding to the image display area 45 and an eighth area 48 corresponding to the non-image display area 46. The controller 16 may set second subpixels 23 included in the eighth area 48 to have a dark tone, for example, the darkest tone. The controller 16 may set second subpixels 23 included in the seventh area 47 to have a light tone, for example, the lightest tone. This allows the non-image display area 46 in the image viewable by the user to be displayed darker, thus increasing the contrast in the displayed 2D image.

In FIGS. 10 and 11, the third area 41 and the fourth area 42 are arranged vertically on the first display panel 14. The shapes and the arrangement of the third area 41 and the fourth area 42 are not limited to those shown in FIGS. 10 and 11. The third area 41 for displaying a 2D image and the fourth area 42 for displaying a parallax image may be arranged at any positions on the first display panel 14. The first display panel 14 may have the third area 41 and the fourth area 42 with the shapes and arrangement changeable dynamically. In the example shown in FIG. 12, the third area 41 and the fourth area 42 are arranged differently from those shown in FIGS. 10 and 11.

The controller 16 controls switching and/or is configured to control switch between the first display mode for displaying a 2D image in the third area 41 and the second display mode for displaying a 3D image in the fourth area 42 on the first display panel 14. When switching the control over the third area 41 and the fourth area 42, the controller 16 accordingly switches and/or is configured to switch the first drive mode for operating the fifth area 43 and the second drive mode for operating the sixth area 44 on the second display panel 15. The controller 16 may switch and/or be configured to switch the first display mode and the second display mode partially on the first display panel 14. When switching between the first display mode and the second display mode, the controller 16 may accordingly switch and/or be configured to switch the first drive mode and the second drive mode partially on the second display panel 15.

In the example shown in FIG. 12, the controller 16 displays and/or is configured to display, for example, 2D character information on the image display area 45 in the third area 41 and displays a parallax image on the fourth area 42 on the first display panel 14. The controller 16 sets and/or is configured to set the seventh area 47 in the fifth area 43 to have a light tone and sets the eighth area 48 to have a dark tone on the second display panel 15. The controller 16 causes and/or is configured to cause the sixth area 44 on the second display panel 15 to display a parallax barrier including the attenuation areas 31 and the transmissive areas 32 extending in a predetermined direction, and allows the user to view the parallax image displayed on the fourth area 42 as a 3D image.

In the examples shown in FIGS. 11 and 12, the image display area 45 is rectangular and includes an image of, for example, a set of characters. However, the image display area 45 may be defined in a subpixel unit and may be an area including first subpixels 21 having a tone with a predetermined value or greater. In the example shown in FIG. 13, the first display panel 14 shows a character o. In this case, the image display area 45 may be an area defined by the first subpixels 21 having tones other than the darkest tone or tones substantially equivalent to the darkest tone, and the non-image display area 46 may be the remaining area. In this example, the controller 16 recognizes the image display area 45 from image data. More specifically, the controller 16 may search and/or be configured to search a line buffer to display an image on the first display panel 14 for first subpixels 21 having the darkest tone or tones substantially equivalent to the darkest tone, and determine and/or be configured to determine such first subpixels 21 as the non-image display area 46 and the remaining subpixels as the image display area 45.

The controller 16 determines and/or is configured to determine the seventh area 47 corresponding to the image display area 45 and the eighth area 48 corresponding to the non-image display area 46 on the second display panel 15 based on the positions of the left and right eyes El and Er. When the areas on the first display panel 14 viewed by the left and right eyes El and Er through the second subpixels 23 on the second display panel 15 are both the non-image display area 46, the controller 16 may determine and/or be configured to determine that such second subpixels 23 belong to the eighth area 48. When at least one of the left and right eyes El and Er views the image display area 45 through the second subpixels 23, the controller 16 may determine and/or be configured to determine that such second subpixels 23 belong to the seventh area 47. In the example shown in FIG. 14, the seventh area 47 has a greater width than the image display area 45 in x-direction to allow the image display area 45 to be viewable by either of the left and right eyes El and Er.

As described above, the controller 16 sets and/or is configured to set the seventh area 47 and the eighth area 48. The display device 11 can thus display the area with no 2D image at a darker level, thus increasing the contrast in the displayed 2D image.

Movable Object

FIG. 15 is a schematic diagram of a head-up display 51 installed in a movable object 50, such as a vehicle, as one implementation of the display device according to the present disclosure. The head-up display 51 may be referred to as a HUD. The head-up display 51 includes a display device 52 and a detector 53. The detector 53 detects and/or is configured to detect the positions of the left and right eyes El and Er of the user who is the driver of the movable object 50, and transmits and/or is configured to transmit the information to the display device 52. The display device 52 includes an illuminator 54, a first display panel 55, a second display panel 56, and a controller that is configured to control (e.g. is configured to control) these components. The illuminator 54, the first display panel 55, the second display panel 56, and the controller have the structures similar to the structures of the illuminator 13, the first display panel 14, the second display panel 15, and the controller 16 in the display device 11 shown in FIG. 1, and will not be described.

The display device 52 further includes an optical system that is configured to project the image displayed on the first display panel 55 into the field of view of the user as a virtual image. The optical system includes a first optical member 57, a second optical member 58, and a projection receiving member 59. The first optical member 57 is a mirror that reflects image light from the first display panel 55 and transmitted through the second display panel 56. The second optical member 58 is a mirror that reflects the image light reflected by the first optical member 57 toward the projection receiving member 59. One or both of the first optical member 57 and the second optical member 58 may be concave mirrors having a positive refractive power. The projection receiving member 59 is a semitransparent member that reflects the incident image light toward the user's left and right eyes El and Er and transmits the light incident from the front of the user (e.g. the light incident from outside of the movable object 50). The projection receiving member 59 may be a part of the front windshield. The projection receiving member 59 may be a dedicated combiner. The first optical member 57, the second optical member 58, and the projection receiving member 59 project and/or are configured to project the image displayed on the display area (active area) on the first display panel 55 to form a virtual image 60 within the field of view of the user. The surface on which the virtual image 60 is displayed may be referred to as a virtual display surface viewed by the user. The structure of the optical system is not limited to the combination of mirrors. The optical system may have various structures such as a combination of a mirror and a lens.

With the structure described above, the head-up display 51 projects and/or is configured to project a 2D image and a 3D image into the user's field of view as the virtual image 60 in accordance with the positions of the user's left and right eyes El and Er. The 2D image is perceived by the user as appearing at the position where the virtual image 60 appears. The 3D image is perceived to have a depth further from the position where the virtual image 60 is displayed with the parallax between the left and right eyes El and Er caused by the parallax image.

The structure according to the present disclosure is not limited to the structure described in the above embodiments, but may be modified or altered variously. For example, the functions of the components and the steps are reconfigurable unless any contradiction arises. Components may be combined into a single unit or a single component may be divided into separate units.

For example, the display device 11 has the first display panel 14 between the illuminator 13 and the second display panel 15. However, the display device 11 may have the second display panel 15 between the first display panel 14 and the illuminator 13. In this case, the illuminator 13 is configured to illuminate the second display panel 15, and the output from the second display panel 15 is configured to enter the first display panel 14. The display device 11 having the positions of the first display panel 14 and the second display panel 15 replaced as above provides the same functions and advantageous effects. In the same manner, the display device 52 may have the second display panel 56 between the illuminator 54 and the first display panel 55.

In the above embodiments, the display device 11 displays and/or is configured to display a 2D image in one area and a 3D image in another area. The image displayed on the display device 11 may be entirely switched between a 2D image and a 3D image.

The movable object according to the present disclosure includes a vehicle, a vessel, and an aircraft. The vehicle according to the present disclosure includes, but not limited to, an automobile and an industrial vehicle, and may also include a railroad vehicle, a community vehicle, and a fixed-wing aircraft traveling on a runway. The automobile includes, but is not limited to, a passenger vehicle, a truck, a bus, a motorcycle, and a trolley bus, and may also include other vehicles traveling on a road. The industrial vehicle includes an agricultural vehicle and a construction vehicle. The industrial vehicle includes, but is not limited to, a forklift and a golf cart. The agricultural vehicle includes, but is not limited to, a tractor, a cultivator, a transplanter, a binder, a combine, and a lawn mower. The construction vehicle includes, but is not limited to, a bulldozer, a scraper, a power shovel, a crane vehicle, a dump truck, and a road roller. The vehicle includes man-powered vehicles. The classification of the vehicle is not limited to the above. For example, the automobile may include an industrial vehicle travelling on a road, and one type of vehicle may fall within classes. The vessel according to the present disclosure includes a jet ski, a boat, and a tanker. The aircraft according to the present disclosure include a fixed-wing aircraft and a rotary-wing aircraft.

The terms such as first, second, and other descriptors may be used herein to distinguish one component from another. The components distinguished with such terms are herein interchangeable. For example, the first direction herein may be termed the second direction. The descriptors may be interchanged simultaneously, allowing the components to be still distinguished from one another. The descriptors may be eliminated. The components without such descriptors may be distinguished with symbols. The terms such as first, second, and other descriptors alone herein do not imply a sequence or order of the components, and the existence of smaller or larger number descriptors.

REFERENCE SIGNS LIST 10 display system
11 display device
12 detector
13 illuminator
14 first display panel
14a liquid crystal layer
14b, 14c glass substrate
14d color filter
15 second display panel
15a liquid crystal layer
15b, 15c glass substrate
16 controller
17 input unit
18 display information obtaining unit
19 optical system
21 first subpixel
22 pixel
23 second subpixel
31 attenuation area (first area)
32 transmissive area (second area)
33 third subpixel
34 fourth subpixel
35 left eye viewable area
36 right eye viewable area
41 third area
42 fourth area
43 fifth area
44 sixth area
45 image display area
46 non-image display area
47 seventh area
48 eighth area
50 movable object
51 head-up display
52 display device
53 detector
54 illuminator
55 first display panel
56 second display panel
57 first optical member
58 second optical member
59 projection receiving member
60 virtual image
El left eye
Er right eye Thte invention claimed is:

1. A display device, comprising:
a first display panel including first subpixels arranged in a grid in a first direction and a second direction;
a second display panel including second subpixels arranged in a grid in the first direction and the second direction;
a controller configured to control the first subpixels and the second subpixels based on image data; and
an optical system configured to project an image displayed on the first display panel into a field of view of a user,
the controller being configured to perform switching between display modes including a first display mode for displaying a two-dimensional image on the first display panel and a second display mode for displaying a parallax image on the first display panel, and to perform switching of a drive mode of the second display panel between drive modes including a first drive mode corresponding to the first display mode and a second drive mode corresponding to the second display mode,
wherein the controller is configured to display the two-dimensional image in a third area on the first display panel, display the parallax image in a fourth area different from the third area on the first display panel, and to control a fifth area on the second display panel corresponding to the third area to operate in the first drive mode and control a sixth area on the second display panel corresponding to the fourth area to operate in the second drive mode,
wherein the fifth area includes a seventh area, corresponding to an image display area within the third area, and an eighth area, corresponding to a non-image display area within the third area, the controller being configured to set second subpixels included in the eighth area to have a dark tone and set second subpixels included in the seventh area to have a light tone.

2. The display device according to claim 1, wherein in the second display mode, the controller causes third subpixels selected from the first subpixels to display an image for the left eye, causes fourth subpixels selected from the first subpixels other than the first subpixels selected as the third subpixels to display an image for the right eye, and controls the second subpixels to operate in the second drive mode, and in the second drive mode, the controller sets first areas including selected ones of the second subpixels to have a darker tone than second areas including selected ones of the second subpixels to attenuate at least a portion of image light passing through the third subpixels toward the right eye of the user through the first areas and to attenuate at least a portion of image light passing through the fourth subpixels toward the left eye of the user through the first areas.

3. The display device according to claim 2, wherein the second areas each continuously extend obliquely to the first direction and the second. direction, and/or are periodically arranged in the first direction at predetermined intervals, and/or have substantially the same width, and/or the first areas each continuously extend obliquely to the first direction and the second direction, and/or are periodically arranged in the first direction at predetermined intervals, and/or have substantially the same width, and/or the first areas and the second areas are arranged alternately.

4. The display device according to claim 2, wherein in the second drive mode, the controller sets the first areas to have a darkest tone for the second subpixels.

5. The display device according to claim 2, further comprising:

an input unit configured to receive an input of positional information about the left and right eyes of the user, wherein in the second drive mode, the controller shifts the first areas based on the positional information about the left and right eyes of the user received by the input unit and/or wherein in the second display mode, the controller shifts the third subpixels and the fourth subpixels based on the positional information about the left and right eyes of the user received by the input unit.

6. The display device according to claim 1, wherein the controller is configured to partially perform switching between the first display mode and the second display mode, and partially perform switching between the first drive mode and the second drive mode.

7. The display device according to claim 1, wherein in the first display mode, the controller detects an image display area and a non--image display area from the image data, causes the first subpixels included in the first display panel to display an image based on the image data, and sets second subpixels corresponding to the non-image display area to have a darkest tone for the second subpixels.

8. The display device according to claim 7, further comprising:

an input unit configured to receive an input of positional information about the left and right eyes of the user, wherein in the first drive mode, the controller shifts the second subpixels corresponding to the non-image display area based on the positional information about the left and right eyes of the user received by the input unit.

9. The display device according to claim 1, wherein the first display panel includes a color filter corresponding to the first subpixels, and/or the second display panel includes no color filter.

10. The display device according to claim 1, wherein:

the controller is configured to control a third area including first subpixels selected from the first subpixels included in the first display panel to operate in the first display mode, control a fourth area including first subpixels other than the first subpixels included in the third area selected from the first subpixels included in the first display panel to operate in the second display mode, control a fifth area including second subpixels corresponding to the third area selected from the second subpixels included in the second display panel to operate in the first drive mode, and control a sixth area including second subpixels corresponding to the fourth area selected from the second subpixels included in the second display panel to operate in the second drive mode.

11. The display device according to claim 1, wherein the optical system is configured to project a virtual image of the first display panel into the field of view of the user.

12. The display device according to claim 1, the second display panel being arranged between the first display panel and the optical system, and/or the display device further comprising an illuminator, wherein optionally the first display panel is arranged between the illuminator and the second display panel, wherein further optionally the illuminator, the first display panel and the second display panel are arranged in the stated order from the far side from a user along an optical path of the image light from the image displayed for the user and/or wherein further optionally the illuminator, the first display panel, the second display panel and the optical system are arranged in the stated order, and/or the first display panel being a self-luminous display panel, wherein optionally the first display panel and the second display panel are arranged in the stated order from the far side from a user along an optical path of the image light from the image displayed for the user and/or wherein optionally the first display panel, the second display panel and the optical system are arranged in the stated order.

13. A display system, comprising:

a display device according to claim 1; and a detector configured to detect positions of the left and right eyes of the user, wherein in the second drive mode, the controller controls at least one of the first display panel and the second display panel based on the positions of the left and right eyes of the user detected by the detector.

14. A movable object, comprising:

a display device according to claim 1.

15. The display device according to claim 1, the plurality of second subpixels being arranged with the same pitch as the plurality of first subpixels, optionally the first direction corresponding to a direction for causing parallax between left and right eyes of a user, and/or the second direction and the first direction intersecting each other, with the second direction optionally being substantially perpendicular to the first direction, and/or wherein the first display panel and/or the second display panel include a transmissive display area, and/or wherein at least one of the first display panel and the second display panel, which is arranged closer the user than the other one, include a transmissive display area, and/or wherein the first subpixels each overlap one of the second subpixels in a direction normal to the first display panel, and/or wherein the first display panel and the second display panel are arranged to allow an output from the first display panel to enter the second display panel or to allow an output from the second display panel to enter the first display panel.

16. A movable object, comprising:
a display system according to claim 13.

* * * * *